(12) United States Patent
Yajima et al.

(10) Patent No.: US 6,356,277 B1
(45) Date of Patent: *Mar. 12, 2002

(54) YUV-RGB DIGITAL CONVERSION CIRCUIT AND PICTURE DISPLAY DEVICE AND ELECTRONIC EQUIPMENT USING THE SAME

(75) Inventors: Kenichiro Yajima, Tatsuno-machi; Masaniri Konishi, Shiojiri, both of (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,178

(22) PCT Filed: Jan. 22, 1998

(86) PCT No.: PCT/JP98/00282

§ 371 Date: Sep. 22, 1998

§ 102(e) Date: Sep. 22, 1998

(87) PCT Pub. No.: WO98/33330

PCT Pub. Date: Jul. 30, 1998

(30) Foreign Application Priority Data

Jan. 24, 1997 (JP) .............................. 9-025853

(51) Int. Cl.$^7$ ................................ G09G 5/04
(52) U.S. Cl. ...................... 345/603; 345/604
(58) Field of Search ................. 345/154, 153, 345/155, 603, 604; 348/659

(56) References Cited

U.S. PATENT DOCUMENTS

| | | | | |
|---|---|---|---|---|
| 5,671,022 A | * | 9/1997 | Ishida | 348/659 |
| 5,784,050 A | * | 7/1998 | Corry | 345/154 |
| 5,831,687 A | * | 11/1998 | Hirano et al. | 345/603 |
| 5,872,556 A | * | 2/1999 | Rackley et al. | 345/154 |
| 5,914,728 A | * | 7/1999 | Yamagishi et al. | 345/127 |
| 5,923,316 A | * | 7/1999 | Kitamura et al. | 345/603 |

FOREIGN PATENT DOCUMENTS

| | | | |
|---|---|---|---|
| JP | A-61-73492 | 4/1986 | |
| JP | A-62-200889 | 9/1987 | 370/376 |
| JP | A-3-10492 | 1/1991 | |
| JP | A-9A55957 | 2/1997 | 348/659 |

* cited by examiner

*Primary Examiner*—Jeffery Brier
*Assistant Examiner*—Ryan Yang
(74) *Attorney, Agent, or Firm*—Oliff & Berridge, PLC

(57) ABSTRACT

A YUV-RGB digital conversion circuit which can be reduced in circuit scale. The YV-R conversion circuit in the YUV-RGB conversion circuit which converts digital luminance signal (Y) and digital color difference signals (U and V) into digital chrominance signals (R, G, and B) computes the R signal by approximately developing the coefficient 1.371 in the expression of R=Y+(V−128)×1.371 in terms of a finite number, $2^{-n}$ (n: a natural number). The YV-R conversion circuit is provided with a plurality of bit shift circuits (42, 46, 50, 52 and 56) which output the products of input signals and $2^{-k}$ (k: a natural number of $\leq$n) by bit-shifting the input signals. A plurality of adders (44, 48, 54, 58, 60, and 62) which perform addition on terms of two sets of products of the input signals and $2^{-k}$ (k: a multiplier), with the (k) having different values. Of the adders, the adder (44) is commonly used for the addition of a plurality of sets having k's with difference equal to one. The adders, in addition, are connected so that the adders can preferentially perform addition on the terms of $2^{-n}$ with a small value and a corresponding pair of values. When the output of a preceding adder is to be bit-shifted by means of a bit shift circuit, the addition is performed by a plurality of number of times by omitting low-order bits having no paired augend in the addition by means of the adders of the next and farther stages.

9 Claims, 17 Drawing Sheets

YUV-RGB DIGITAL CONVERSION CIRCUIT AND PICTURE DISPLAY DEVICE AND ELECTRONIC EQUIPMENT USING THE SAME

BACKGROUND OF THE INVENTION

1. Field of the Invention

The present invention relates to a YUV-RGB digital conversion circuit which converts a digital luminance signal Y and digital color-difference signals U and V into digital color signals R, G, and B, an image display apparatus using the same, and an electronic apparatus using the image display apparatus.

2. Description of Related Art

As an electronic apparatus using an image display apparatus, for example, a projector will be given as an example.

A liquid-crystal display apparatus of this projector includes a liquid-crystal panel having a liquid crystal sealed between a pair of substrates, a signal processing circuit for performing signal processing, such as gamma correction or polarity inversion, suitable for driving the liquid-crystal panel, on an input RGB signal, and a driving circuit for driving the liquid-crystal panel on the basis of an output of this signal processing circuit.

Here, because of a demand for a liquid-crystal display apparatus with a smaller size, the signal processing circuit must be formed into an IC. Therefore, a digital RGB signal must be provided to the signal processing circuit of the liquid-crystal display apparatus.

The RGB signal provided to this liquid-crystal display apparatus is output from the control board of the main unit of the projector. This control board is provided with a YUV-RGB conversion circuit for converting a luminance signal Y and color-difference signals U and V into RGB signals. Here, in the control board, it is necessary to perform various processing on the RGB signal, and since a memory, such as a VRAM, is used for this processing, digital processing is suitable for the signal processing by the control board. If YUV-RGB conversion by the YUV-RGB conversion circuit is performed digitally, the efficiency is high.

The YUV signal and the RGB signal have the following relationship when each signal is assumed to be of 8 bits (=256 gradations):

$$R = Y + (V-128) \times 1.371 \quad (1)$$

$$G = Y - (V-128) \times 0.337 - (U-128) \times 0.698 \quad (2)$$

$$B = Y + (U-128) \times 1.733 \quad (3)$$

The value of 128, which is subtracted from the color-difference signals U or V, is the middle value of 256 gradations and differs depending upon the total number of gradations. The reason why the middle value of the total gradation value is subtracted from the color-difference signals U and V as described above is that each coefficient shown in equations (1) to (3) must be multiplied by a color-difference signal which becomes positive or negative, assuming to be zero when it has the middle value of the full gradation value.

Here, each of the coefficients multiplied by (V-128) and (U-128) includes a decimal, such as 1.371, 0.337, 0.698, or 1.733.

To realize a product of such decimals by logic, a method is known in which this decimal is expanded into the sum of $2^{-n}$ (n is a natural number) and computed. For example, $(V-128) \times 0.5 = (V-128) \times 2^{-1}$ can be determined by shifting the digital value of $(V-128)$ by one bit to the lower order. Similarly, $(V-128) \times 2^{-n}$ can be computed easily for each coefficient $(-n)$ by shifting the digital value of $(V-128)$ by n bits to the lower order.

Each of the above-described coefficients is expanded to the sum of $2^{-n}$ as described below.

$$1.371 \approx 2^{0} + 2^{-2} + 2^{-4} + 2^{-5} + 2^{-6} + 2^{-7} + 2^{-9} + 2^{-10} + 2^{-11} + 2^{-12} + 2^{-13} + 2^{-16} + \ldots$$

$$0.337 \approx 2^{-2} + 2^{-4} + 2^{-6} + 2^{-7} + 2^{-10} + 2^{-14} + 2^{-16} + 2^{-17} + 2^{-19} + 2^{-24} + 2^{-25} + \ldots$$

$$0.698 \approx 2^{-1} + 2^{-3} + 2^{-4} + 2^{-7} + 2^{-9} + 2^{-11} + 2^{-12} + 2^{-19} + 2^{-25} + 2^{-26} + 2^{-30} + \ldots$$

$$1.733 \approx 2^{0} + 2^{-1} + 2^{-3} + 2^{-4} + 2^{-5} + 2^{-7} + 2^{-8} + 2^{-9} + 2^{-11} + 2^{-14} + 2^{-16} + 2^{-17} + \ldots$$

Regarding the above-described coefficients, only approximated coefficients can be used as long as the number of expansion terms is finite. Here, if this coefficient is expanded to multiple terms, a more accurate value can be used, but the scale of the circuit becomes large. On the other hand, if the number of expansion terms is decreased too much in order to reduce the scale of the circuit, the computation error becomes larger. As described above, the number of expansion terms of the coefficient must be determined by taking both the scale of the circuit and the computation error into consideration.

Next, the scale of the computation circuit is considered after the number of expansion terms is determined. In the case where, for example, the coefficient 1.371 is expanded to seven terms and approximated in equation (1) described above, if each of these terms is added in sequence, six adders are required, and the scale of the circuit increases. Also, if, for example, the data is of 8 bits, the $2^{0}$ term of the highest order requires 8 bits for only the integer part, and the $2^{-8}$ term of the lowest order requires 8 bits for only the decimal part. During the computation process, 16 bits are required for the total of the integer part and the decimal part, and this causes the scale of the circuit to increase.

SUMMARY OF THE INVENTION

Accordingly, an object of the present invention is to provide a YUV-RGB digital conversion circuit capable of reducing the scale of a circuit by decreasing a number of adders for adding the terms such that a coefficient including a decimal to be multiplied by a digital color-difference signal is approximately expanded to a finite number of $2^{-n}$ terms in each conversion section for converting a digital YUV signal to a digital RGB signal, and an image display apparatus and an electronic apparatus using the YUV-RGB digital conversion circuit.

Another object of the present invention is to provide a YUV-RGB digital conversion circuit capable of reducing the scale of a circuit by truncating unnecessary bits in a computation process in which each term of $2^{-n}$ is added together, and an image display apparatus and an electronic apparatus using the same.

Still another object of the present invention is to provide a YUV-RGB digital conversion circuit capable of outputting an RGB signal such that the display is not inverted even if there is an input value other than a theoretical specified value, and an image display apparatus and an electronic apparatus using the same.

The invention is characterized in that, a YUV-RGB digital conversion circuit for converting a digital luminance signal Y and digital color-difference signals U and V into digital color signals R, G, and B includes a YV-R conversion section for converting a digital luminance signal Y and a digital color-difference signal V into a color signal R, a YUV-G conversion section for converting a digital luminance signal Y and digital color-difference signals U and V into a color signal G, and a YU-B conversion section for converting a digital luminance signal Y and a digital color-difference signal U into a color signal B, each conversion section includes a plurality of bit-shift circuits, provided in each stage, for outputting an input signal×$2^{-k}$ (k is a natural number such that $k \leq n$) by bit-shifting an input signal by one or a plurality of bit-shifting in order to add the terms such that a coefficient including a decimal multiplied by a digital color-difference signal is approximately expanded to a finite number of terms of $2^{-n}$ (n is a natural number); and a plurality of adders, provided in each stage, for performing addition of the terms of two sets of an input signal×$2^{-k}$, whose value of the multiplier k is different, and the addition of a combination such that the difference of each multiplier k of the two sets of terms to be added becomes the same is shared by one adder.

According to the invention, when, for example, a YV signal is converted into an R signal, for example, V×($2^{0}$+$2^{-2}$+$2^{-4}$+$2^{-5}$+$2^{-6}$+$2^{-7}$+$2^{-8}$) is computed, and of this, for example, both $2^{-7}$+$2^{-8}$ and $2^{-5}$+$2^{-6}$ are additions of a first-power difference. Accordingly, initially, after V×$2^{-1}$ is obtained by using a bit-shift circuit of the first stage, the addition of V×$2^{-1}$ and V×$2^{0}$ such that the difference of each multiplier k becomes a first-power difference is performed. If this V($2^{0}$+$2^{-1}$) is shifted by the bit-shift circuit by five bits to the lower-order side, $2^{-5}$+$2^{-6}$ is obtained. If it is shifted by another bit-shift circuit by seven bits to the lower-order side, $2^{-7}$+$2^{-8}$ is obtained. As described above, since one adder can be shared for the addition of terms such that the power difference is equal, it is possible to reduce the scale of the circuit.

The invention is characterized in that, the plurality of adders are connected to multiple stages so that the addition of terms corresponding to a smaller term from among a plurality of terms of $2^{-n}$ is performed with priority, and when the output of the adder of a previous stage is bit-shifted by a bit-shift circuit, a plurality of additions are performed while dropping the low-order bits such that there is no addend to be added in the addition or subsequent additions by the adder of the next stage.

According to the invention, since digits which are not related to the carry-over to the digit of the data of the final output can be truncated during computation, the number of computation bits is reduced, and the scale of the circuit can be reduced.

The invention is characterized in that, the YUV-G conversion section includes a plurality of adders for adding two sets of terms, the term of a color-difference signal U×$2^{-i}$ (i is a natural number such that $i \leq n$) and the term of a color-difference signal V×$2^{-j}$ is a natural number such that $j \leq n$), and the addition of a combination such that the difference (i−j) of each multiplier of two sets of terms is the same is shared by one adder.

In the YUV-RGB conversion section, U and V are used as the color-difference signals, and an adder for adding, for example, the first-power difference term of the digital color-difference signals U, and an adder for adding the first-power difference term of the color-difference signals V cannot be shared in this case because the input data are different from U and V. If it is constructed in accordance with the invention, since the color-difference signal U×$2^{-i}$ and the color-difference signal V×$2^{-j}$ can be input commonly to one adder, the number of adders is decreased, and the scale of the circuit is reduced.

The invention is characterized in that, a carry-over signal, together with an addition output of predetermined bits, is output from the adder of the final stage, and there is further provided a luminance-limit circuit for inputting an output of the adder of the final stage and for forcibly setting the addition output of predetermined bits to all 1 in accordance with the carry-over signal.

According to the invention, even if a value out of the specified range, exceeding a maximum value of the adder of the final stage, is output, the value can be forcibly corrected to a maximum value by the luminance-limit circuit, and the image quality can be improved.

The invention also provides a YUV-RGB digital conversion circuit characterized in that, each conversion section includes a computation unit for subtracting a predetermined gradation value from a color-difference signal U or V, a negative-sign signal indicating that the output of the computation unit is negative, together with an addition output of predetermined bits and a carry-over signal, is output from the adder of the final stage, and the luminance-limit circuit forcibly sets the addition output of predetermined bits to all 0 in accordance with the negative-sign signal.

According to the invention, even if the output of the adder of the final stage becomes a negative value as a result of an input that is out of the specified range, since the output is forcibly corrected to a minimum luminance value by the luminance-limit circuit, the image quality can be improved.

The invention is characterized in that, the total number of expansion terms in which a coefficient to be multiplied by a digital color-difference signal is approximately expanded to a plurality of terms of $2^{-n}$ is set to a finite number such that the SN ratio of each signal of RGB is 60 dB or more.

According to the invention, even if the number of expansion terms is finite, accuracy such that the SN ratio is 60 dB or more can be obtained, and an image having an image quality of a predetermined level or greater can be reproduced while YUV-RGB conversion is being performed digitally.

The invention also provides an image display apparatus and an electronic apparatus including a YUV-RGB digital conversion circuit in accordance with the invention.

DETAILED DESCRIPTION OF PREFERRED EMBODIMENTS

With reference to the embodiments of the present invention shown in the figures, a description will be given below in more detail.

(Construction of the entire apparatus)

Figure 1:
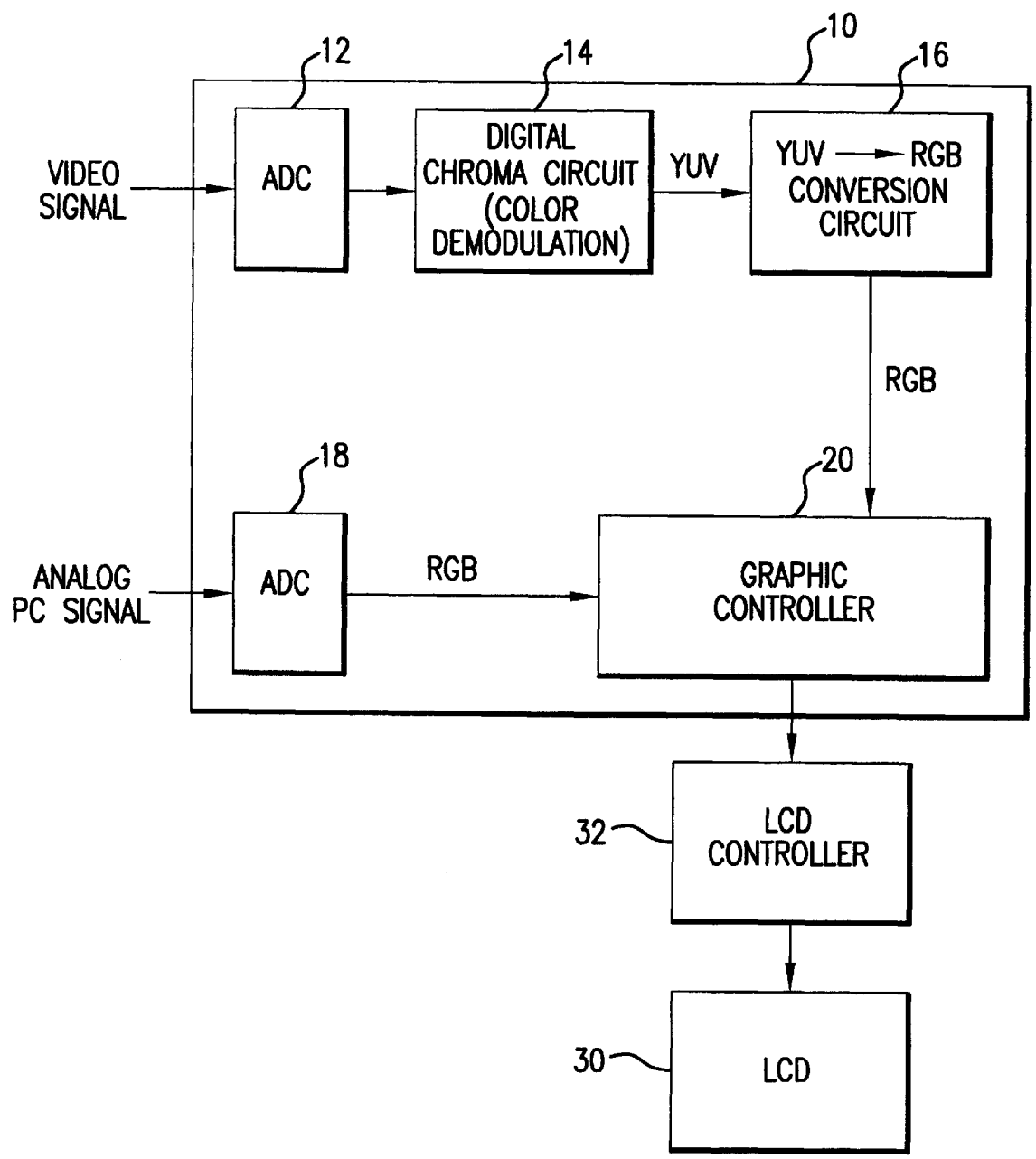
FIG. 1 is a block diagram showing a circuit section required for a liquid-crystal display of an electronic apparatus according to an embodiment of the present invention.
Figure 17:
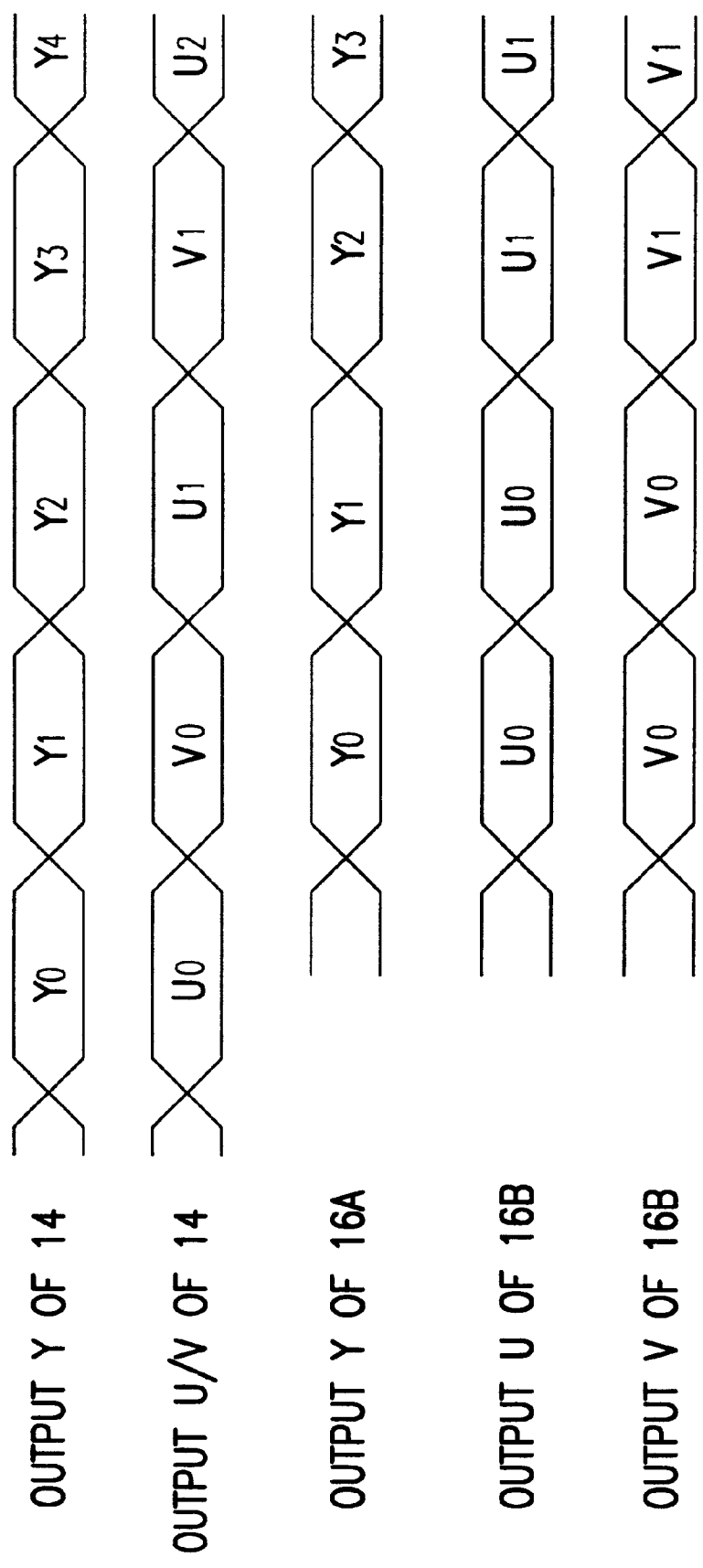
FIG. 17 is a timing chart showing an operation separated by a YUV signal.

FIG. 1 shows a block diagram of the elements involved in a liquid-crystal display of an electronic apparatus, such as a projector, according to an embodiment of the present invention. In FIG. 1, a control board 10 of the electronic apparatus includes an analog-digital converter (ADC) 12 to which is input a composite video signal and which converts it from analog to digital form. A digital chroma circuit 14 is provided in a stage behind the ADC 12. This digital chroma circuit 14 separates the digitized video signal into a luminance signal Y and a U/V signal which is a time-division composite signal. The output of the digital chroma circuit 14 is shown in FIG. 17. The numeric value shown in FIG. 17 indicates a pixel number, and the luminance signal Y has 8-bits of information per one pixel. On the other hand, for the composite signal U/V of the color-difference signal, the same signal is commonly used for the U signal and the V signal for two adjacent pixels, and each of U and V signals has 8-bits of information per two pixels.

Figure 2:
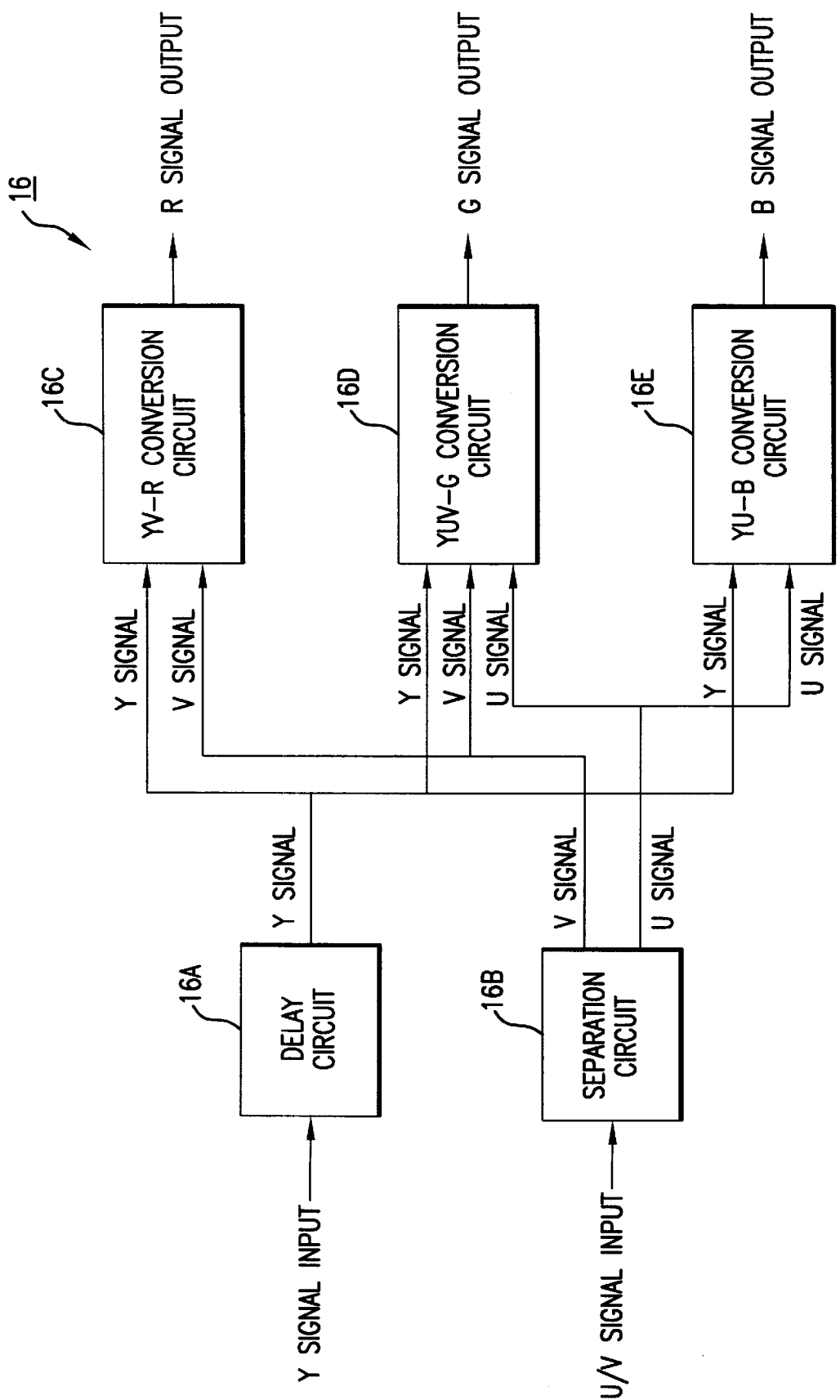
FIG. 2 is a block diagram of a digital chroma circuit and a YUV-RGB conversion circuit of the circuit shown in FIG. 1.

The YUV-RGB conversion circuit 16, to which this signal Y and the U/V signal are input, converts a YUV signal into an RGB signal. As shown in FIG. 2, the YUV-RGB conversion circuit 16 includes a delay circuit 16A which delays the luminance signal Y, and a U/V separation circuit 16B which separates the U/V signal, which is a time-division composite signal, into parallel U and V signals. The Y signal output from the delay circuit 16A, and the U and V signals output from the U/V separation circuit 16B are output in parallel, as shown in FIG. 17.

Further, as shown in FIG. 2, this YUV-RGB conversion circuit 16 includes a YV-R conversion circuit 16C, a YUV-G conversion circuit 16D, and a YU-B conversion circuit 16E, the details of which will be described later.

This control board 10 is provided with an ADC 18 to which is input an analog PC (personal computer) signal, and this ADC 18 converts an analog RGB signal into a digital signal and outputs it.

A graphic controller 20 to which is input a digital RGB signal from the YUV-RGB conversion circuit 16 or the ADC 18 performs various digital processing for graphic display. For this purpose, the graphic controller 20 has a VRAM and stores a digital RGB signal in the VRAM, and performs various processing. For example, since the video signal which is input via the ADC 12 has been subjected to gamma correction for CRT, a gamma correction process for returning this to the original signal is performed by the graphic controller 20. Further, a process for interlace scanning is performed by the graphic controller 20.

The output from the graphic controller 20 is provided to an LCD controller 32 for driving and controlling the LCD 30 shown in FIG. 1. Also in this LCD controller 32, digital processing is performed on the RGB signal. For example, in this LCD controller 32, the following are performed: a gamma correction process according to the applied voltage—transmittance characteristics of the LCD 30, a signal inversion process for driving of polarity inversion, a signal process for decreasing the driving frequency, and a signal process for reducing the effect of amplifier variations on the viewed image.

For the LCD 30, various types of liquid-crystal panels can be used, for example, a simple matrix liquid-crystal display panel which does not use switching elements, an active matrix liquid-crystal display panel which uses three-terminal switching elements typified by a TFT or two-terminal switching elements typified by an HIM, or a ferroelectric liquid-crystal display panel.

Next, the YUV-RGB digital conversion circuit 16, which is a feature element of the present invention, will be described with reference to FIG. 3 and subsequent figures.

(The number of expansion terms of $2^{-n}$ of a coefficient to be multiplied by a color-difference signal)

The YUV-RGB digital conversion circuit 16 respectively computes each of the RGB color signal on the basis of equations (1) to (3) described above, and outputs it. The number of expansion terms of $2^{-n}$ of a coefficient to be multiplied with a color-difference signal will be examined first.

Knowing the extent n of $2^{-n}$, the terms of which are obtained by expanding each coefficient shown in equations (1) to (3), makes it possible to compute the SN ratio of each color RGB when a computation circuit is designed in accordance with the approximated coefficient. The relationship between the number of expansion terms and the SN ratio is shown in Table 1 below.

TABLE 1

|  | $n \leq$ 7 | $n \leq$ 8 | $n \leq$ 9 | $n \leq$ 10 | $n \leq$ 11 | $n \leq$ 12 | $n \leq$ 13 | $n \leq$ 14 |
| --- | --- | --- | --- | --- | --- | --- | --- | --- |
| S/N of R | 57.6 | 87.5 | 87.5 | 87.5 | 87.5 | 87.5 | 87.5 | 87.5 |
| S/N of G | 60.7 | 60.7 | 67.8 | 72.5 | 81.3 | 91.0 | 91.0 | 100.0 |
| S/N of B | 64.9 | 64.9 | 80.0 | 80.0 | 85.4 | 85.4 | 85.4 | 85.4 |

Here, as is clear from Table 1 described above, the smaller the number of expansion terms, the less the computation accuracy becomes. Since noise increases because of a decrease in this computation accuracy, the SN ratio decreases. The reason why the SN ratio does not vary even though the number n is varied in Table 1 described above, is that no term is present which falls within the upper limit of n and which makes the error smaller.

According to the investigations of the inventors of the present invention, it can be seen that when the SN ratio of the computation circuit is 60 [dB] or more, there is no problem with the image quality on the liquid-crystal display. When it is considered that the SN ratio of a laser disk at present is 40 [dB], the validity of this fact is supported. Here, in this embodiment, when considering that this YUV-RGB conversion circuit 16 is formed of an IC and this YUV-RGB conversion IC will be used for a long period of time in the future, the lower limit of the SN ratio of the circuit is set to 70 [dB]. The expansion of each coefficient in this case is as in equations (4) to (7) described below.

$$1.371 \approx 2^0 + 2^{-2} + 2^{-4} + 2^{-5} + 2^{-6} + 2^{-7} + 2^{-8} \quad (4)$$

$$0.337 \approx 2^{-2} + 2^{-4} + 2^{-6} + 2^{-7} + 2^{-10} \quad (5)$$

$$0.698 \approx 2^{-1} + 2^{-3} + 2^{-4} + 2^{-7} + 2^{-9} \quad (6)$$

$$1.733 \approx 2^0 + 2^{-1} + 2^{-2} + 2^{-3} + 2^{-4} + 2^{-5} + 2^{-7} + 2^{-8} + 2^{-9} \quad (7)$$

The number of expansion terms in the case where the low limit of the SN ratio of the circuit is changed can be determined by taking Table 1 described above into consideration.

(Construction principle of the YUV-RGB conversion circuit)

Next, the technique of the construction of the conversion circuit of the present invention will be described by using a circuit for converting a luminance signal Y and a color-difference signal V into a R signal in accordance with the computation equation (1) and the expansion equation (4) described above as an example.

Figure 3:
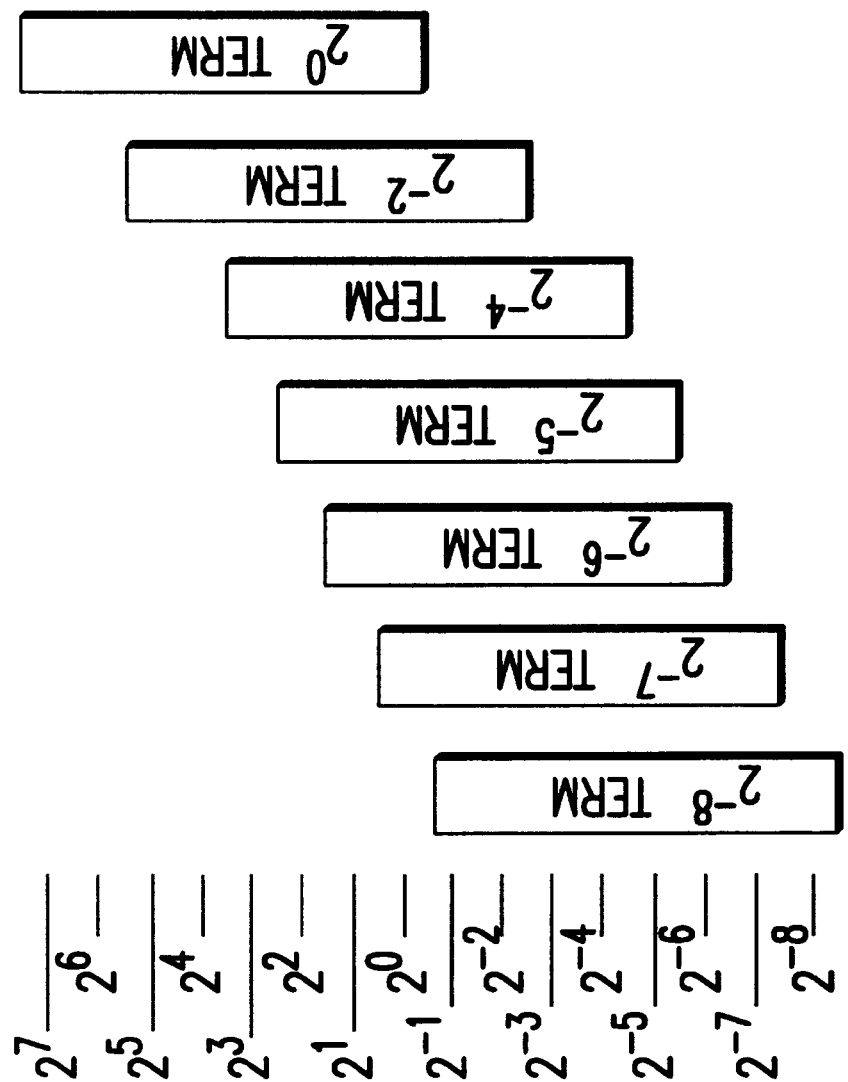
FIG. 3 is a schematic view illustrating a bit expansion of each 8-bit term of V×$2^{-n}$ used in a YV-R conversion.

FIG. 3 shows a bit expansion of each term of the result in which (V−128) of 8 bits to be multiplied by $2^{-n}$ used for the expansion equation (4) is multiplied.

Here, the points that the inventors of the present invention have taken note of are the final output of the result of equation (4) multiplied by the (V−128) of equation (1) has 8 bits of the digits $2^0$ to $2^7$ in FIG. 3, and for the digits other than those, only the digits which are carried over to $2^0$ to $2^{-7}$ in the middle of the addition of equation (4) may be considered.

Therefore, even if the terms that do not influence any of the digits $2^0$ to $2^7$ are ignored during computation, the computation accuracy can be secured, and by decreasing the number of bits in the middle of the computation, the scale of the circuit can be reduced.

Here, if the seven terms shown in FIG. 3 are added in sequence starting from the upper-order term with a large value, the digit equal to or less than $2^{-1}$ may be carried over to the $2^0$ digit or more in the final computation. Under this condition, it is not possible to omit the low-order side bits in the middle of computation, and the scale of circuit cannot be reduced.

Therefore, the inventors of the present invention have decided to add starting from the low-order term with a small value of the seven terms shown in FIG. 3 with priority given thereto.

A case is considered in which, for example, the $2^{-8}$ term plus the $2^{-7}$ term, which are two terms of the low-order side of FIG. 3, are added first. It can be seen that the $2^{-8}$ digit, which is the lowest-order bit of the $2^{-8}$ term, has no addend to be added from now on, and it is a digit which is not related to carry-over and which is not required for computation. Further, it can be seen that after the computation of the $2^{-8}$ term plus the $2^{-7}$ term is completed, the $2^{-7}$ digit of the computation result also has no addend to be added from now on, and it is a digit which is not related to carry-over and which is not required for computation.

As described above, by adding starting from the low-order term with a small value of the seven terms shown in FIG. 3 with priority, it is possible to truncate the digits of the low-order side which are not used for the computation, and a fewer number of bits of the adder is required, making it possible to reduce the scale of the circuit.

Next, an adder for adding the seven terms shown in FIG. 3 is considered. If it is assumed to add starting from the low-order term with a small value in sequence of the seven terms shown in FIG. 3, six adders are required.

Here, as the characteristics of a digital value, the computation of 8 bits×$2^{-k}$ can be realized by a bit-shift circuit which shifts the 8-bit data to the low-order side by k bits, as stated above.

The inventors of the present invention have taken note of the fact that a plurality of sets of combinations of the addition is present such that the difference in the multiplier (−n) of $2^{-n}$ is the same within the seven terms shown in FIG. 3. For example, as a combination of addition such that the difference in the multiplier (−n) becomes a first-power difference, there are two sets, namely a combination of (the $2^{-8}$ term and the $2^{-7}$ term), and a combination of (the $2^{-6}$ term and the $2^{-5}$ term).

At this time, if the input of the adder is assumed to be two inputs of (V−128) before and after passing through a 1-bit-shift circuit, this adder can output (V−128)×($2^0+2^{-1}$). If the output of this adder is shifted by seven bits to the low-order side, the computation result of (the $2^{-8}$ term plus the $2^{-7}$ term) is obtained, and if the output of this adder is shifted by five bits to the low-order side, (the $2^{-6}$ term plus the $2^{-5}$ term) is obtained.

As described above, if the difference in the multiplier (−n) of $2^{-n}$ is the same, this adder can be shared regardless of the value of n. In the embodiment below, the number of adders is reduced by this technique.

(Example of the construction of the YV-R conversion circuit)

The YUV-RGB conversion circuit produced in accordance with the above-described construction principle includes three conversion circuits as in the equations (1) to (3) described above. An example thereof will be described by using the YV-R conversion circuit shown in FIG. 4 as an example.

Figure 4:
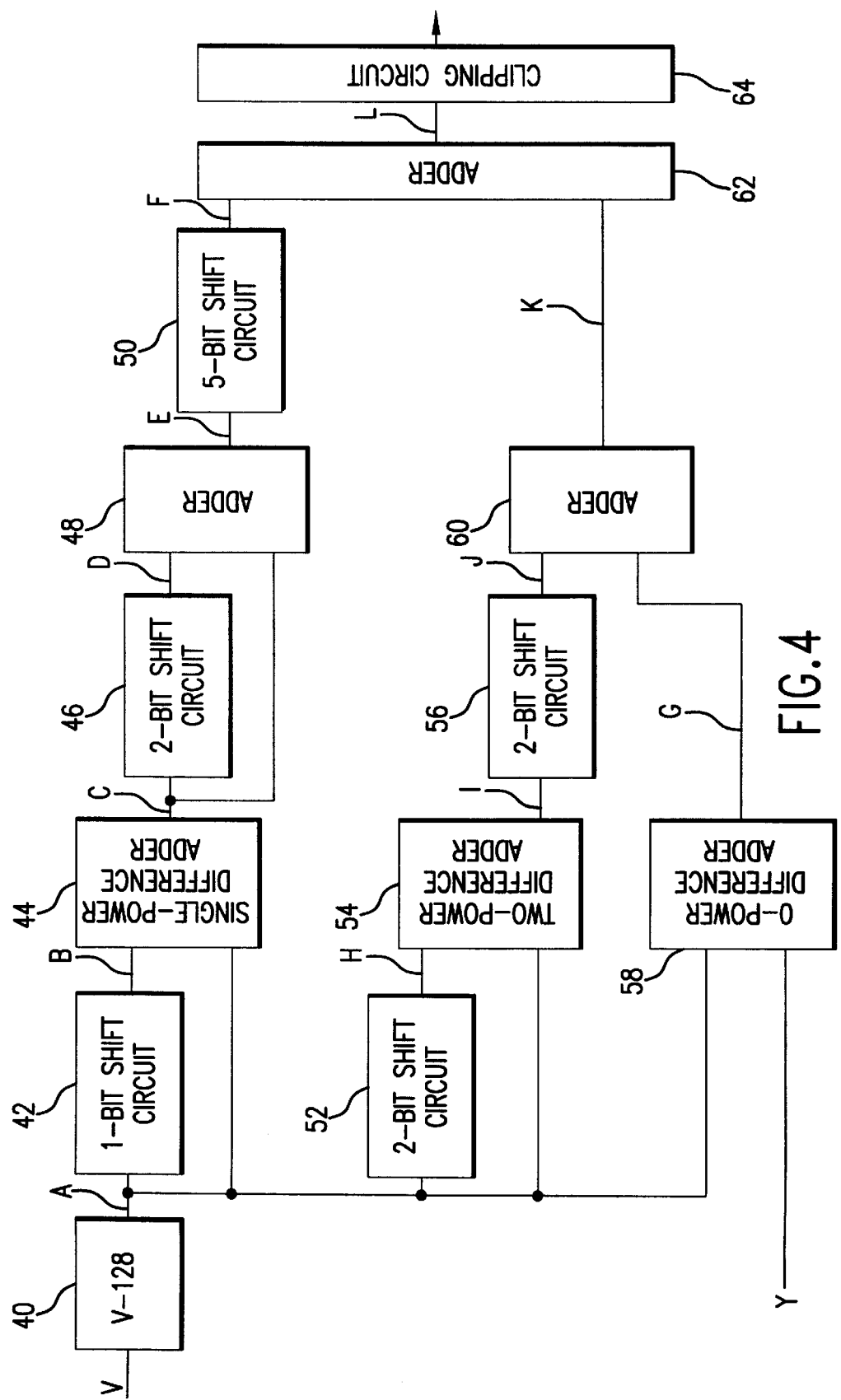
FIG. 4 is a block diagram showing an example of the YV-R conversion circuit.
Figure 5:
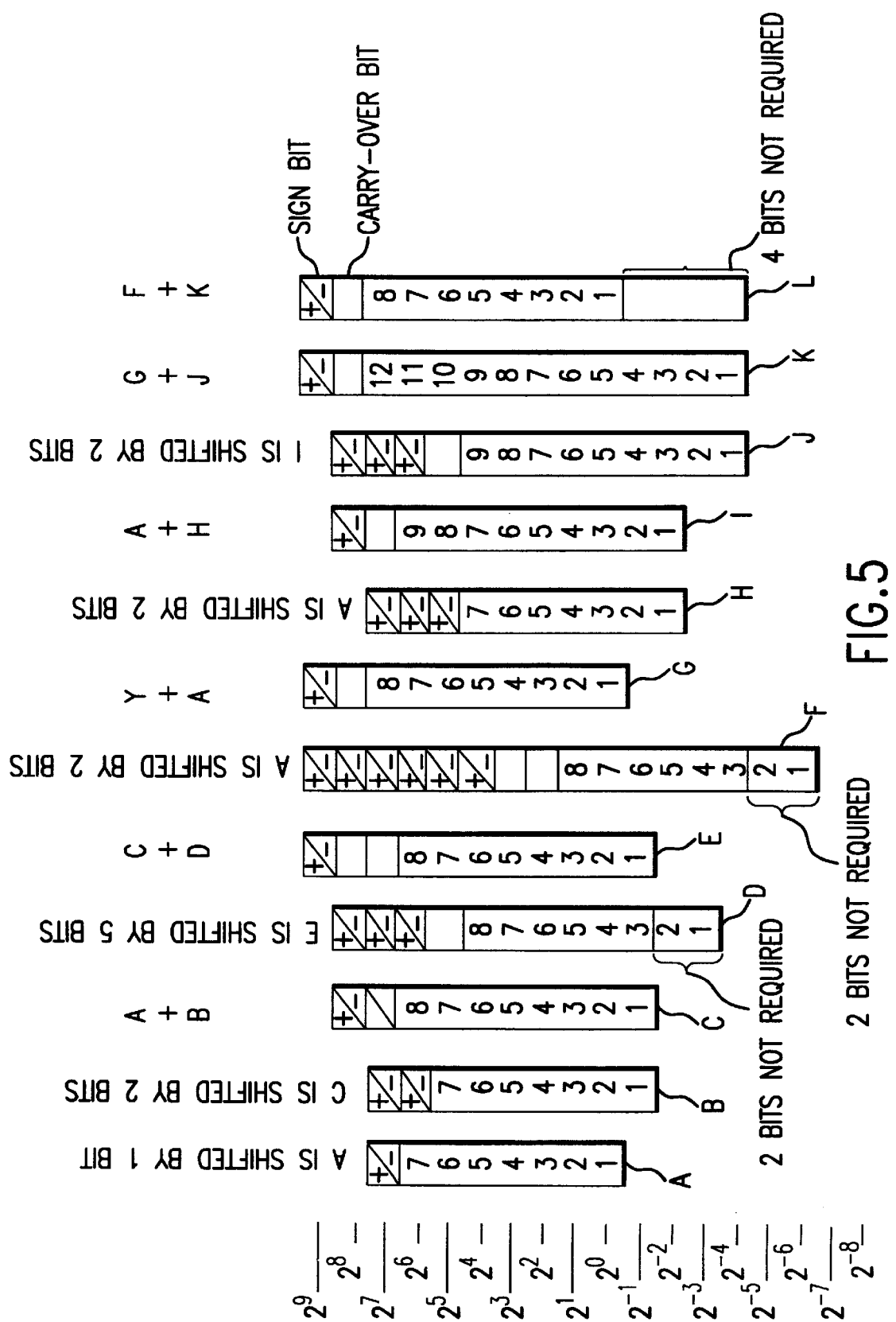
FIG. 5 is a schematic view illustrating output data of each circuit of FIG. 4.

An input to the YV-R conversion circuit shown in FIG. 4 is an 8-bit luminance signal Y and a color-difference signal V. The color-difference signal V is input to a (V−128) computation unit 40 where the computation of V−128 is performed. This computation can be performed only by inverting the highest-order bit of the 8-bit color-difference signal V with respect to a digital value. This value is indicated by A as shown in FIG. 5. This 8-bit data A becomes a positive or negative value of −128 to +127, and the data itself can be represented by 8 bits. Here, since the maximum value of the positive value of the data A is 127, if the data A is positive, the bit of $2^7$ is always "0". When the data A is negative, for example, when A=−1, the data is represented in such a way that each of the bits of $2^0$ to $2^7$ becomes "1", and when A=−2, only the $2^0$ bit becomes "0". Therefore, when the data A is negative, the bit of $2^7$ is always "1". As described above, in this embodiment, the value of the highest-order bit of the data A represents a code bit, as shown in FIG. 5. By using this fact, a gradation-limit process based on the code is performed by a clipping circuit 64 to be described later. The information of the data A is not limited to that described above, and the information of the data A may be set in such a way that, when, for example, A=−128, each of the bits of $2^0$ to $2^7$ is set to "0", when A =+127, each of the bits of $2^0$ to $2^7$ is set to "1", when the data A is positive, the $2^7$ bit is always "1", and when the data A is negative, the $2^7$ bit is always "0".

In the circuit shown in FIG. 4, the conversion from YV to R is performed in such a manner as to be divided into the first to fourth terms as in equation (8) described below.

$$R = Y + (V - 128) \times (2^0 + 2^{-2} + 2^{-4} + 2^{-5} + 2^{-6} + 2^{-7} + 2^{-8})$$
$$= \text{first term} + \text{second term} + \text{third term} + \text{fourth term}$$

where
the first term=$[(V-128)\times(2^{-7}+2^{-8})]$
the second term=$[(V-128)\times(2^{-5}+2^{-6})]$
the third term=$[(V-128)\times(2^{-2}+2^{-4})]$
the fourth term=$[Y+(V-128)\times 2^0]$ (8)

Then, in FIG. 4, in order to perform the computation of first term plus second term=$[(V-128)\times(2^{-7}+2^{-8})]+[(V-128)\times(2^{-5}+2^{-6})]$, a 1-bit shift circuit 42 is provided in the first stage, a first-power difference adder 44 is provided in the second stage, a 2-bit shift circuit 46 is provided in the third stage, an adder 48 is provided in the fourth stage, and a 5-bit shift circuit 50 is provided in the fifth stage.

For the above-described first and second terms, the difference in the multiplier (−n) of $2^{-n}$ is a first-power difference, and the first-power difference adder 44 is shared to compute these two sets. This computation of the first term plus the second term will be described with reference to FIGS. 4 and 5. By causing the above-described data A to pass through the 1-bit shift circuit 42, as shown in FIG. 5, a data B such that the data A is shifted by one bit to the low-order side is obtained. During this 1-bit shift, the value of the code bit of the highest-order bit of the data A is added to the bit of $2^7$ of the data B, and code extension is performed. Therefore, the data B becomes 9 bits (see FIG. 5). Also during the subsequent k-bit shift, code extension is performed such that the sign bit of the highest-order bit before being bit shifted is added to the k digits of the upper-order side of the data after being bit shifted.

Next, as an output C of the first-power difference adder 44 which computes A+B, $(V-128)\times(2^0+2^{-1})$ is obtained. All of the addition computations, including this computation of A+B, are performed by adding the bit values of the same digit (including the digits of the carry-over bit and the code bit) and by taking the carry-over into consideration. When there is no data in the same digit (the $2^{-1}$ digit in the case of A+B), 0 is added.

This data C becomes 8-bit data such that the lowest-order digit of the data part is $2^{-1}$ and the highest-order digit of the data part is $2^6$, as shown in FIG. 5. Since a carry-over occurs during this addition, the $2^7$ digit becomes a carry-over bit, and the $2^8$ digit of the data C becomes a code bit, becoming 10 bits in total.

As a result of this data C being shifted by two bits to the low-order side by the 2-bit shift circuit 46, a data D=$(V-128)\times(2^{-2}+2^{-3})$ is obtained. As shown in FIG. 5, this data D is such that, in addition to 8-bit data such that the lowest-order digit of the data part is $2^{-3}$ and the highest-order digit of the data part is $2^4$, the $2^5$ digit becomes a carry-over bit, and the three bits $2^6$ to $2^8$ are code-extended to become a code bit, becoming 12 bits in total.

Meanwhile, this data D is added to the data C by the adder 48. For this and subsequent addition, the data of the digits $2^{-3}$ and $2^{-2}$ of the two low-order digits of the data D has no addend to be added. Therefore, the data of the two low-order digits of the data D can be truncated as shown in FIG. 5.

As a result of the above, for the C+D=E=$(V-128)\times(2^0+2^{-1}+2^{-2}+2^{-3})$, which is the computation result of the adder 48, as shown in FIG. 5, the data part becomes 8 bits in the same manner as the data C. In this case, the two digits $2^7$ and $2^8$ are required as carry-over bits, and the $2^9$ digit becomes a code bit.

Next, a data E is shifted by the 5-bit shift circuit 48 by five bits to the low-order side, and a data F is obtained. This data F is such that, in addition to the 8-bit data such that the lowest-order digit of the data part is $2^{-6}$ and the highest-order digit of the data part is $2^{-1}$, the two digits of $2^2$ and $2^3$ become carry-over bits, and the five digits of $2^4$ to $2^9$ are code-extended to become code bits, becoming 16 bits in total. Meanwhile, this data F is to be added to another data by an adder 62 to be described later. For this and subsequent additions, the data of the digits $2^{-6}$ and $2^{-5}$ of the two low-order digits of the data F have no addend to be added. Therefore, the data of the two low-order digits of the data F can be truncated as shown in FIG. 5. As a result, the data F becomes 14 bits in total.

Next, the computation of the above-described third and fourth terms of equation (8) is described below. As circuits for performing the computation of the third term, as in FIG. 4, a 2-bit shift circuit 52 of the first stage, a second-power difference adder 54 of the second stage, and a 2-bit shift circuit 56 of the third stage are provided.

Further, a 0-power difference adder 58 is provided for the computation of the fourth stage. Further, an adder 60 is provided to perform the addition of the third term and the fourth term.

The computation of the fourth term will be described first. The output A of the (V−128) computation unit 40 and the luminance signal Y are input to the 0-power difference adder 58, and a data G=$Y+(V-128)\times 2^0$ shown in FIG. 5 is obtained as the output thereof. This data G is such that, in addition to the 8-bit data such that the lowest-order digit of the data part is $2^0$, and the highest-order digit of the data part is $2^7$, the $2^8$ digit becomes a carry-over bit, and the $2^9$ digit becomes a code bit, becoming 10 bits in total.

Next, the computation of the third term will be described. Initially, the data A from the (V−128) computation unit 40 is shifted by the 2-bit shift circuit 52 by two bits to the low-order side, and a data H shown in FIG. 5 is obtained. This data H is such that, in addition to 7-bit data such that the lowest-order digit of the data part is $2^{-2}$ and the highest-order digit of the data part is $2^4$, the digits $2^5$ to $2^7$ are code-extended to become code bits, becoming 10 bits in total. The second-power difference adder 54 adds this data H and the data A together and obtains a data I shown in FIG. 5 as A+H $(V-128)\times(2^0+2^{-2})$. This data I has 9-bit data such that the lowest-order digit of the data is $2^{-2}$ and the highest-order digit of the data is $2^6$, the $2^7$ digit becomes a carry-over bit, and the $2^8$ digit becomes a code bit, becoming 11 bits in total. This data I is further shifted by the 2-bit shift circuit 56 by two bits to the low-order side and becomes a data J. Therefore, this data J is such that, in addition to the 9-bit data such that the lowest-order digit of the data part is $2^{-4}$ and the highest-order digit of the data part is $2^4$, the $2^5$ digit becomes a carry-over bit, digits $2^6$ to $2^8$ are code-extended to become code bits, becoming 13 bits in total.

As the output of the adder 60 which performs the computation of the third term plus the fourth term, a data K is obtained as shown in FIG. 5. This data K is such that, in addition to the 12-bit data such that the lowest-order digit of the data is $2^{-4}$ and the highest-order digit of the data is $2^7$, the digit of $2^8$ becomes a carry-over bit, and the digit of $2^9$ becomes a code bit, becoming 14 bits in total. In the data K, since a carry-over of the $2^9$ bit or more is not required as data, it is not necessary to provide carry-over data in the $2^9$ digit.

Finally, as an output of the adder 62 of the final stage for performing the computation of the first term plus the second term plus the third term plus the fourth term, a data L is obtained as shown in FIG. 5. Since the data part of this final output may be 8 bits, the four low-order bits are truncated as in FIG. 5, in addition to the data part of $2^0$ to $2^7$, the $2^8$ digit becomes a carry-over bit, and the $2^9$ digit becomes a core bit.

When there is an input YV within the specified range, the minimum value of the 8-bit output data L is 0 (all the 8 bits are 0) and the maximum value is 255 (all the 8 bits are 1). However, when there is an input out of the specified range, there is a case in which, for example, the value of the data L is 256 (all the 8 bits are 0), and the data L has a carry-over bit in preparation for a malfunction in this case. In another example, there is a case in which, for example, the output data L=−1 (all of the 8-bit data are 1), and the data L has a code bit in preparation for a malfunction in this case.
(Clipping circuit)

As shown in FIG. 4, the clipping circuit 64 functioning as a luminance limit circuit is provided in a stage behind the adder 62 of the final stage. This clipping circuit 64 has two functions. One of them is to resolve a malfunction when a code bit indicates negative as described above. In this case, since the data L may be assumed to be "0", all the 8 bits of each digit of $2^0$ to $2^7$ of the data L are forcibly set to "0".

The other function of the clipping circuit 64 is to resolve a malfunction when there is a carry-over in the data L. At this time, since the data L may be assumed to be "255", all the 8 bits of each digit of $2^0$ to $2^7$ of the data L are forcibly set to "1".

Figure 6:
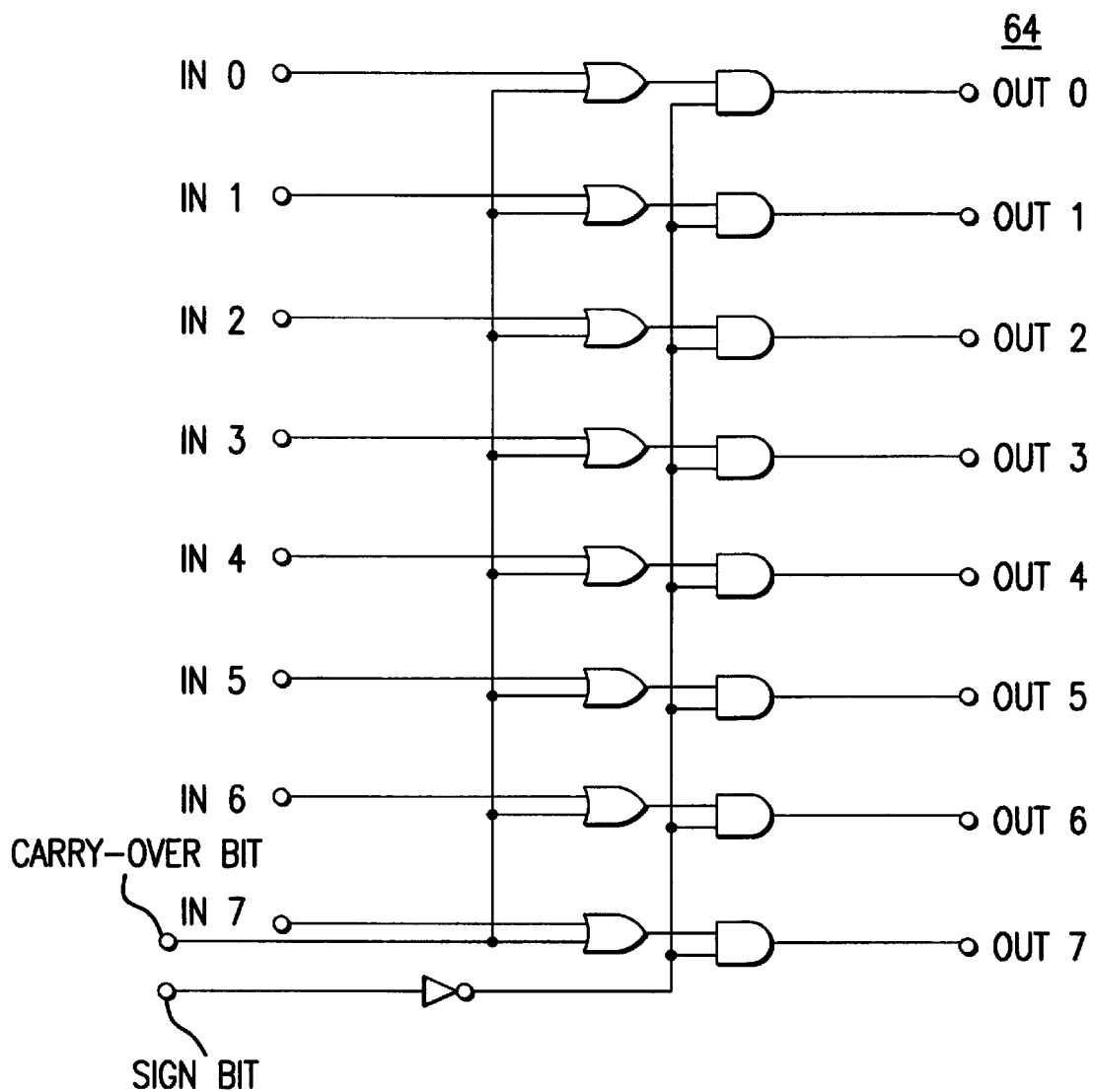
FIG. 6 is a circuit diagram showing an example of a clipping circuit shown in FIG. 3.

An example of this clipping circuit 62 is shown in FIG. 6. As shown in the figure, when the code bit is "1", since "0" is input to the eight AND gates via an inverter, the output of each digit of the 8 bits is forcibly set to "0". Here, when the code bit is "0", since "1" is always input to one of the input ends of the AND gates, as long as the carry-over bit is "0", the 8 bits of the output data L are output via an OR gate and the AND gates unchanged. On the other hand, when the carry-over bit becomes "1", since "1" is input to the other input ends of all the AND gates via the OR circuit, the output of each digit of the 8 bits is forcibly set to "1".
(Another example of the construction of the YV-R conversion section)

Figure 7A:
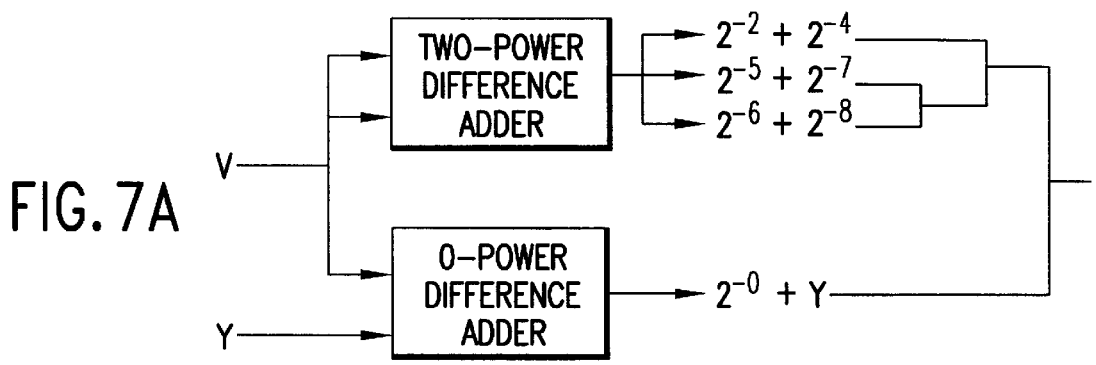
FIGS. 7(A) to 7(C) are schematic views which show schematically the technique of YV-R conversion, YU-B conversion, and YUV-G conversion.

FIG. 7(A) shows schematically a modification of the YV-R conversion circuit. Unlike the embodiment of FIG. 4, FIG. 7(A) shows an example in which a second-power difference adder 72 is shared for the addition of three types of second-power differences, $[(V-128)\times(2^{-2}+2^{-4})]$, $[(V-128)\times(2^{-5}+2^{-7})]$, and $[(V-128)\times(2^{-6}+2^{-8})]$.

Figure 8:
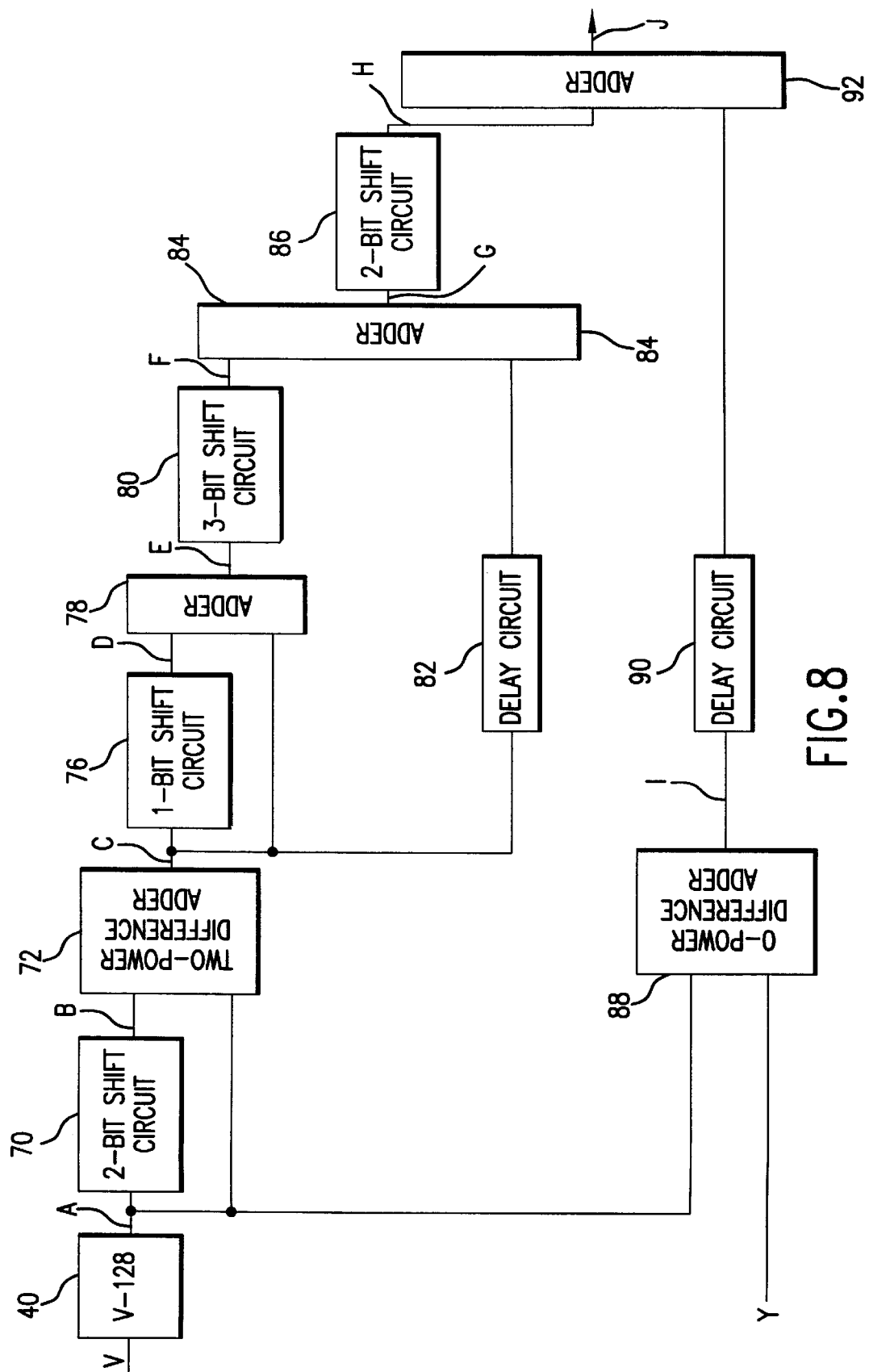
FIG. 8 is a block diagram of the YV-R conversion circuit designed d in accordance with the technique shown in FIG. 7(A).
Figure 9:
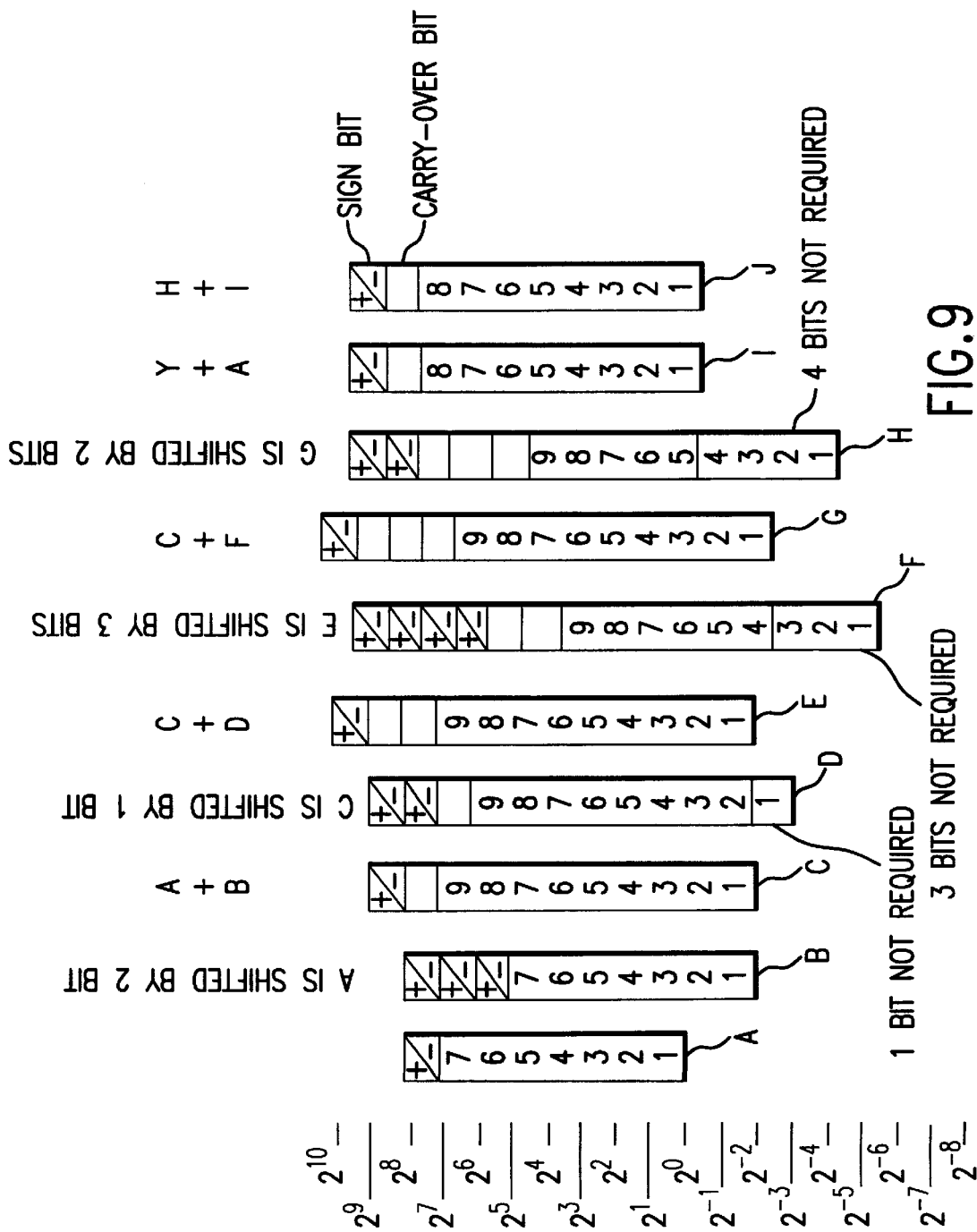
FIG. 9 is a schematic view illustrating output data of each circuit of FIG. 8.

The details of the YV-R conversion circuit of FIG. 7(A) are shown in FIG. 8, and signals A to J in FIG. 8 are shown in FIG. 9. The code bit and the carry-over bit shown in FIG. 9 are the same as those of the embodiment of FIGS. 4 and 5. In FIGS. 8 and 9, the output data A from the (V−128) computation unit 40 is the same as that of FIG. 4, and the output data B of a 2-bit shift circuit 70 becomes $$B=(V-128)\times2^{-2}.$$

The output data C from the second-power difference adder 72 in a subsequent stage becomes $$C=(V-128)\times(2^0+2^{-2}).$$

The output data D from a 1-bit shift circuit 76 in a stage behind that becomes $$D=(V-128)\times(2^{-1}+2^{-3}).$$

The output data E from an adder 78 in a stage behind that becomes $$E=(V-128)\times(2^0+2^{-1}+2^{-2}+2^{-3}).$$

The output data F from a 3-bit shift circuit 80 in a stage behind that becomes $$F=(V-128)\times(2^{-3}+2^{-4}+2^{-5}+2^{-6})$$

Here, one of the data C input to an adder 84 must be delayed by the amount of time that the other data F is obtained after passing through the adder 78, therefore, it is delayed by a delay circuit 82, and synchronization is obtained. The output data G of the adder 84 becomes $$G=(V-128)\times(2^0+2^{-2}+2^{-3}+2^{-4}+2^{-5}+2^{-6})$$

The output data H from a 2-bit shift circuit 86 behind that becomes $$H=(V-128)\times(2^{-2}+2^{-4}+2^{-5}+2^{-6}+2^{-7}+2^{-8}).$$

On the other hand, the output data I from a 0-power difference adder 88 becomes $$I=Y+(V-128),$$

this is delayed by a delay circuit 90, synchronization with the output data H from the 2-bit shift circuit 86 is obtained, and it is input to an adder 92 of the final stage. Then, as output data J from this adder 92 of the final stage, $$J=Y+(V-128)\times(2^0+2^{-2}+2^{-4}+2^{-5}+2^{-6}+2^{-7}+2^{-8})$$

is obtained, and the same result as that of the embodiment of FIGS. 4 and 5 is obtained. This output data J is supplied to the clipping circuit 64 shown in FIG. 6.
(An example of the construction of the YU-B conversion circuit)

Figure 7B:
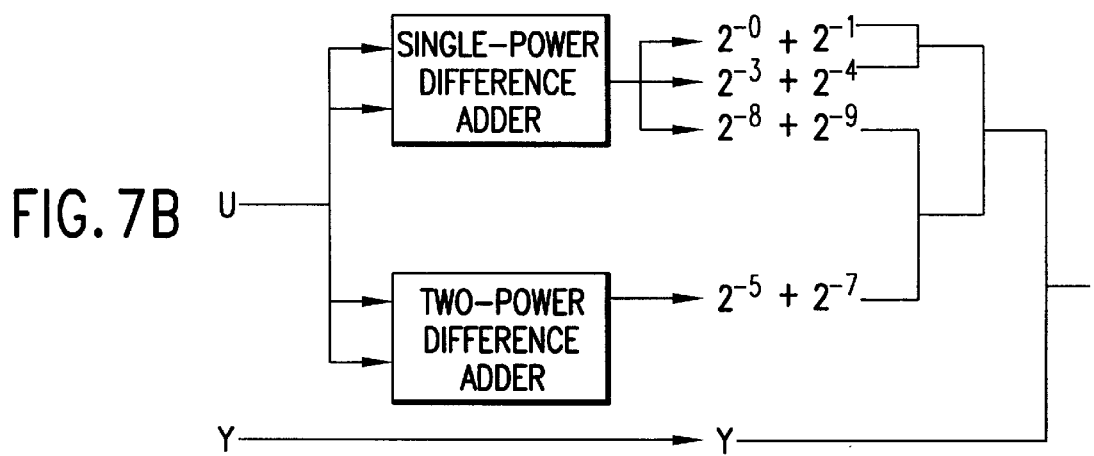
Figure 10:
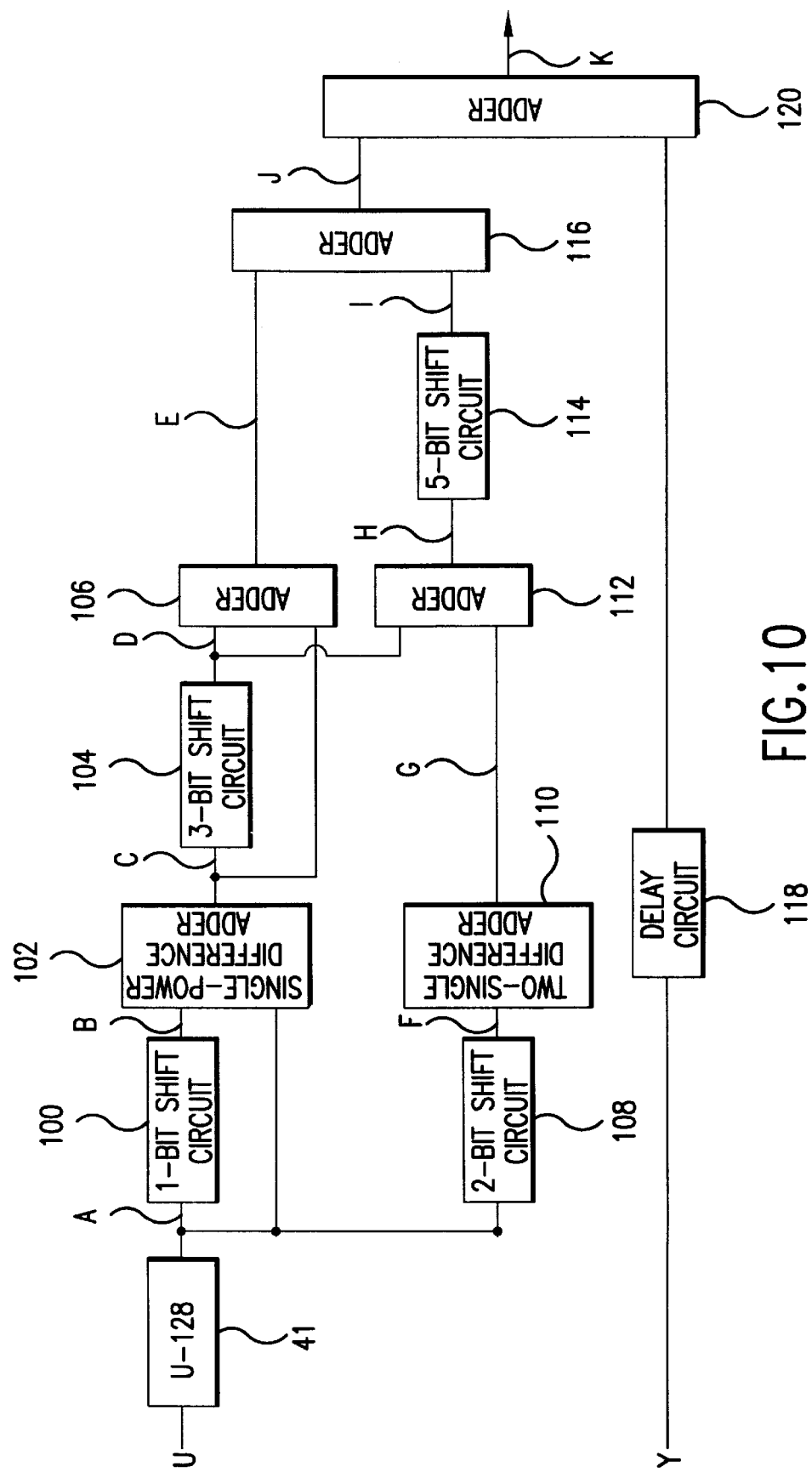
FIG. 10 is a block diagram of the YU-B conversion circuit designed in accordance with the technique shown in FIG. 7(B).

FIG. 7(B) schematically shows the YU-B conversion circuit. The details of the YU-B conversion circuit of FIG. 7(B) are shown in FIG. 10. Each data shown in FIG. 10 also has a sign bit and a carry-over bit in the same manner as in the above-described embodiment, but the details thereof have been omitted. In the embodiment of FIG. 10, a first-power difference adder 102 is shared for the computation of three types of first-power difference.

In FIG. 10, the output data A from a (U-128) computation unit 41 is the same as that of FIGS. 4 and 8. The output data B of a 1-bit shift circuit 100 becomes $$B=(U-128)\times2^{-1}.$$

The output data C from the first-power difference adder 102 in a stage behind that becomes $$C=(U-128)\times(2^0+2^{-1}).$$

The output data D from the 3-bit shift circuit 104 in a stage behind that becomes $$D=(U-128)\times(2^{-3}+2^{-4}).$$

The output data E from an adder 106 in a stage behind that becomes $$E=(U-128)\times(2^0+2^{-1}+2^{-3}+2^{-4}).$$

On the other hand, the output data A from the (U−128) computation unit 41 is also input to a 2-bit shift circuit 108, and the output data F becomes $$F=(U-128)\times 2^{-2}.$$

The output data G from a second-power difference adder 110 in a stage behind that becomes $$G=(U-128)\times(2^0+2^{-2}).$$

The data D and G are input to an adder 112 after that, and the output data H becomes $$H=(U-128)\times(2^0+2^{-2}+2^{-3}+2^{-4}).$$

As the output data I of a 5-bit shift circuit 114 in a stage after that, $$I=(U-128)\times(2^{-5}+2^{-7}+2^{-8}+2^{-9})$$

is obtained. The output data J of an adder 116 to which the data H and I are input becomes $$J=(U-128)\times(2^0+2^{-1}+2^{-3}+2^{-4}+2^{-5}+2^{-7}+2^{-8}+2^{-9}).$$

Further, the luminance signal Y is delayed by a delay circuit 118, obtaining synchronization with the data J, it is input to an adder 120 of the final stage, and as the output data K, $$K=Y+(U-128)\times(2^0+2^{-1}+2^{-3}+2^{-4}+2^{-5}+2^{-7}+2^{-8}+2^{-9})$$

is obtained. The same result as that of equation (7) is obtained. This output data K is supplied to the clipping circuit 64 shown in FIG. 6.

(Example of the construction of the YUV-G conversion circuit)

Figure 7C:
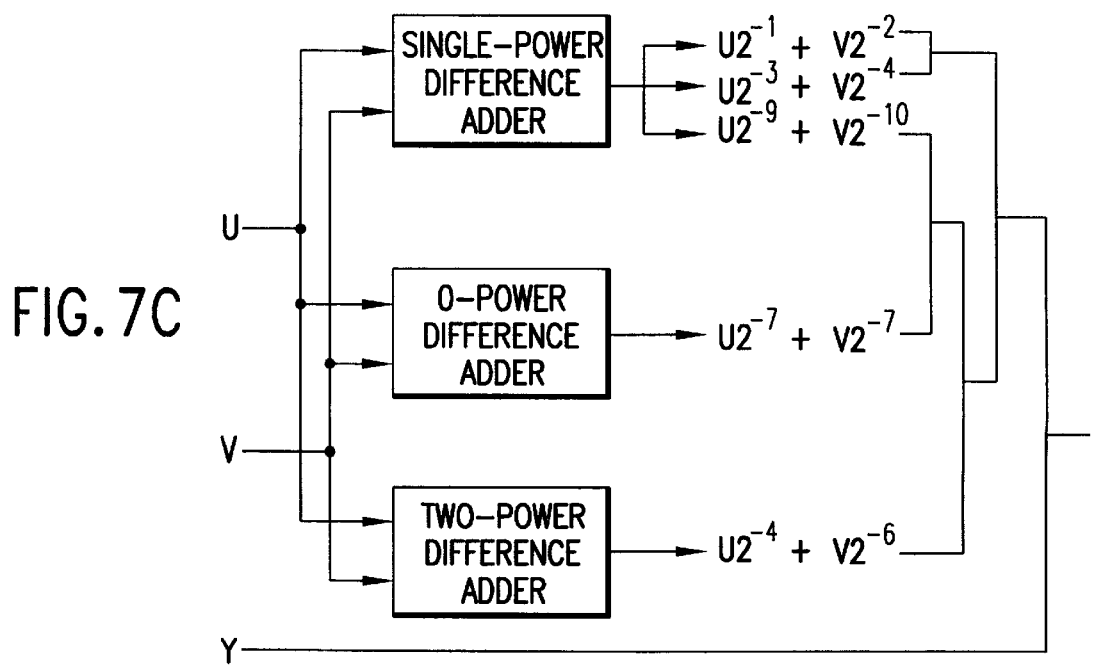

FIG. 7(C) schematically shows an example of the YUV-G conversion circuit.

In the example of FIG. 7(C), a first-power difference adder is shared for the addition of three types of first-power difference terms. Here, the feature which differs from the above-described embodiment is that when adding together a color-difference signal $U\times 2^{-i}$ and a color-difference signal $U\times 2^{-j}$, an adder is shared for the combination such that the difference (i−j) of each multiplier becomes the same (a first-power difference in this example). The reason for this is as follows: in this embodiment, an adder for adding the term of a first-power difference of the color-difference signals U, and an adder for adding the term of a first-power difference of the color-difference signals V cannot be shared because the input data are different from U and V.

Figure 11:
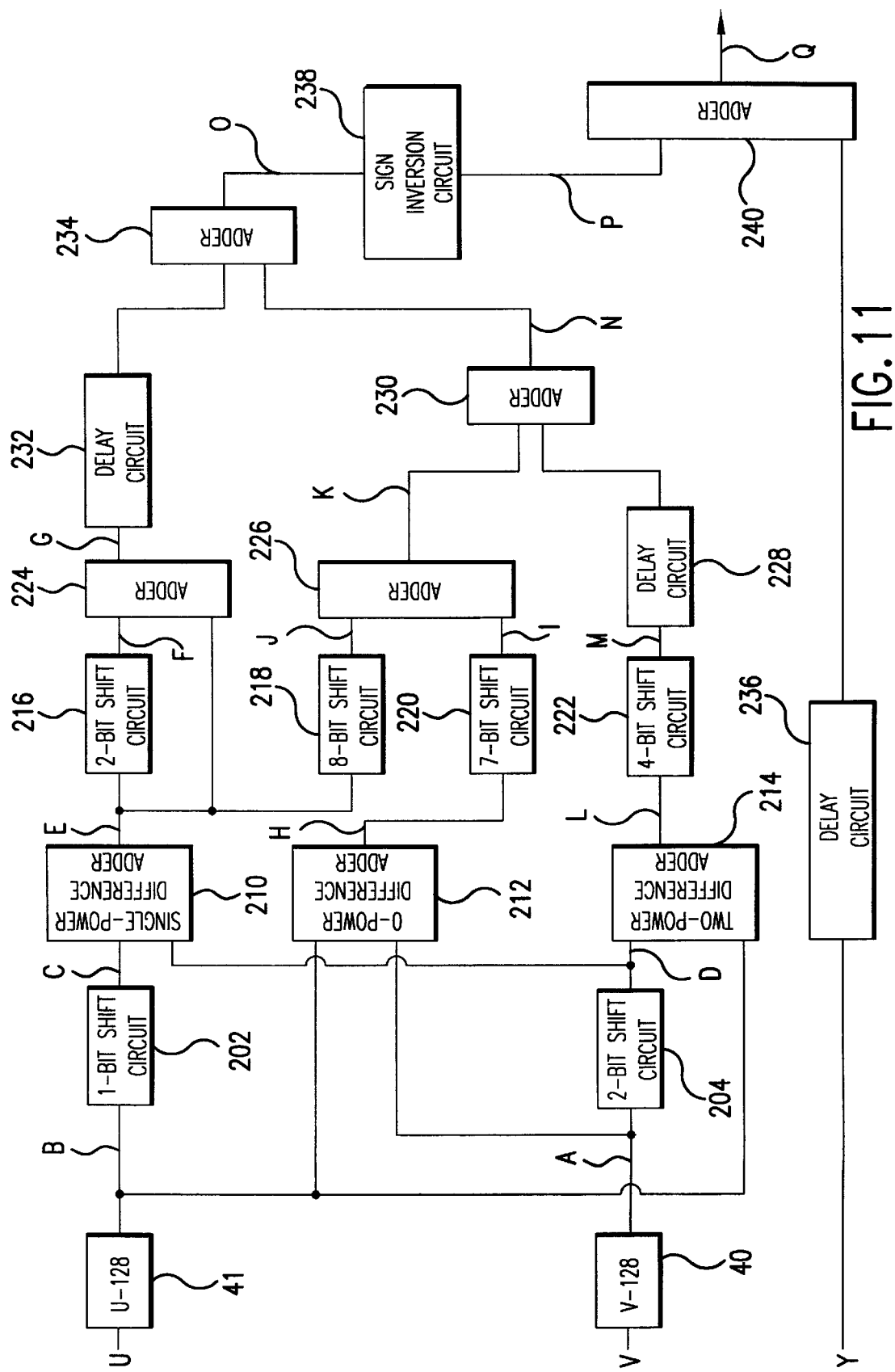
FIG. 11 is a block diagram of the YUV-G conversion circuit designed in accordance with the technique shown in FIG. 7(C).

The details of this circuit of FIG. 7(C) are shown in FIG. 11. In FIG. 11, the output data A of the (V−128) computation unit 40 is input to a 2-bit shift circuit 204 and a 0-power difference adder 212, and the output data B of the (U−128) computation unit 41 is input to a 1-bit shift circuit 202 and the 0-power difference adder 212.

The computation of the route of a first-power difference adder 210 will be described first. The output data C from the 1-bit shift circuit 202 to which the data B is input becomes $$C=(U-128)\times 2^{-1}.$$

The output data D of the 2-bit shift circuit 204 to which the data A is input becomes $$D=(V-128)\times 2^{-2}.$$

The output data E from the first-power difference adder 210 to which the data C and D are input becomes $$E=(U-128)\times 2^{-1}+(V-128)\times 2^{-2}.$$

This data E is shifted by a 2-bit shift circuit 216 by two bits to the low-order side, and as the output data F, $$F=(U-128)\times 2^{-3}+(V-128)\times 2^{-4}$$

is obtained. Further, as the output data G from an adder 224 to which the data E and F are input, $$G=(U-128)\times(2^{-1}+2^{-3})+(V-128)\times(2^{-2}+2^{-4})$$

is obtained.

Next, the computation route of the 0-power difference adder 212 is described. As output data H from the 0-power difference adder 212 to which data A and B are input, $$H=(U-128)+(V-128)$$

is obtained. This data G is shifted by a 7-bit shift circuit 220 by seven bits to the low-order side, and as the output data I, $$I=(U-128)\times 2^{-7}+(V-128)\times 2^{-7}$$

is obtained. On the other hand, the output data E from the first-power difference adder 210 is also input to a 8-bit shift circuit 218, and as the output data J, $$J=(U-128)\times 2^{-9}+(V-128)\times 2^{-10}$$

is obtained.

As output data K from an adder 226 to which these data I and J are input, $$K=(U-128)\times(2^{-7}+2^{-9})+(V-128)\times(2^{-7}+2^{-10})$$

is obtained.

Next, the computation route of a second-power difference adder 214 is described. As output data L from the second-power difference adder 214 to which data B and D are input, $$L=(U-128)+(V-128)\times 2^{-2}$$

is obtained. This data L is shifted by a 4-bit shift circuit 222 by four bits to the low-order side, and as the output data M, $$M=(U-128)\times 2^{-4}+(V-128)\times 2^{-6}$$

is obtained. This data M is delayed by a delay circuit 228, obtaining synchronization with the data K, and the data is input to an adder 230. The output data N from the adder 230 becomes $$N=(U-128)\times(2^{-4}+2^{-7}+2^{-9})+(V-128)\times(2^{-6}+2^{-7}+2^{-10})$$

Further, the data G from the adder 224 is delayed by a delay circuit 232 and input to an adder 234 together with the data N from the adder 230. The output data O from this adder 234 becomes $$O=(U-128)\times(2^{-1}+2^{-3}+2^{-4}+2^{-7+2^{-9}})+(V-128)\times(2^{-2}+2^{-4}+2^{-6}+2^{-7}+2^{-10}).$$

This data O is input to a sign inversion circuit 238 where all of the 10 bits formed of the 8-bit data part, the carry-over bit, and the sign bit are inverted. Further, "1" is added to the lowest-order bit, and data P on which a data inversion process has been performed is output.

Finally, the luminance signal Y is delayed by a delay circuit 236 so as to be synchronized with the data P, and this signal Y and the data P are input to the adder 24. Since the data P has been inverted in advance, data P is subtracted from the signal Y, and as the output data Q from this adder 24, $$Q=Y-(U-128)\times(2^{-1}+2^{-3}+2^{-4}+2^{-7}+2^{-9})-(V-128)\times(2^{-2}+2^{-4}+2^{-6}+2^{-7}+2^{-10})$$

is obtained. The feature that this data Q is also supplied to the clipping circuit 64 is the same as in each of the above-described embodiments.

The present invention is not limited to the above-described embodiments, and various modifications are possible within the spirit and scope of the present invention.

For example, although omitted in each of the above-described embodiments, preferably, a circuit formed of, for example, a D-type flip-flop, for obtaining synchronization of two inputs, is inserted into the stage before the adder. In this case, as in the above-described embodiment, by truncating unused low-order bits, the number of D-type flip-flops required for each bit can be decreased, and this contributes to a circuit having a reduced scale.

Figure 12:
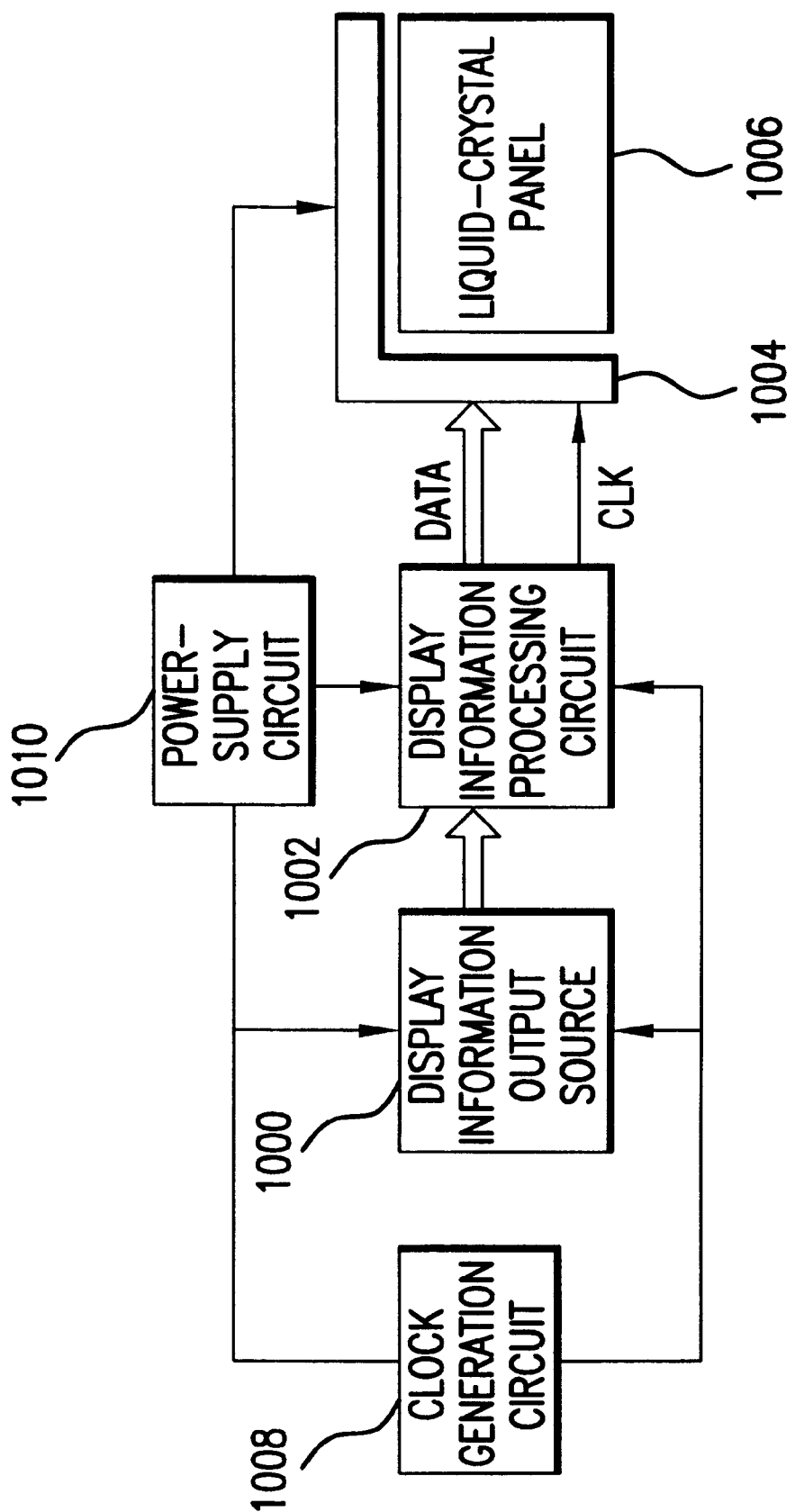
FIG. 12 is a block diagram of an electronic apparatus.

The electronic apparatus constructed by using the liquid-crystal display apparatus of the above-described embodiment comprises a display information output source 1000, a display information processing circuit 1002, a display driving circuit 1004, a display panel 1006, such as a liquid-crystal panel, a clock generation circuit 1008, and a power-supply circuit 1010, which are shown in FIG. 12. The display information output source 1000, which comprises a memory, such as a ROM and/or a RAM, and a tuning circuit for tuning to a television signal and outputting it, outputs display information, such as a video signal, in accordance with the clock from the clock generation circuit 1008. This display information output source 1000 includes a YUV-RGB conversion circuit of each of the above-described embodiments. The display information processing circuit 1002 processes display information in accordance with the clock from the clock generation circuit 1008 and outputs it. This display information processing circuit 1002 may include, for example, an amplification/polarity inversion circuit, a gamma correction circuit, and a clamping circuit. The display driving circuit 1004, which comprises a scanning-side driving circuit and a data-side driving circuit, causes the liquid-crystal panel 1006 to be driven and displayed. The power-supply circuit 1010 supplies power to each of the above-described circuits.

Figure 13:
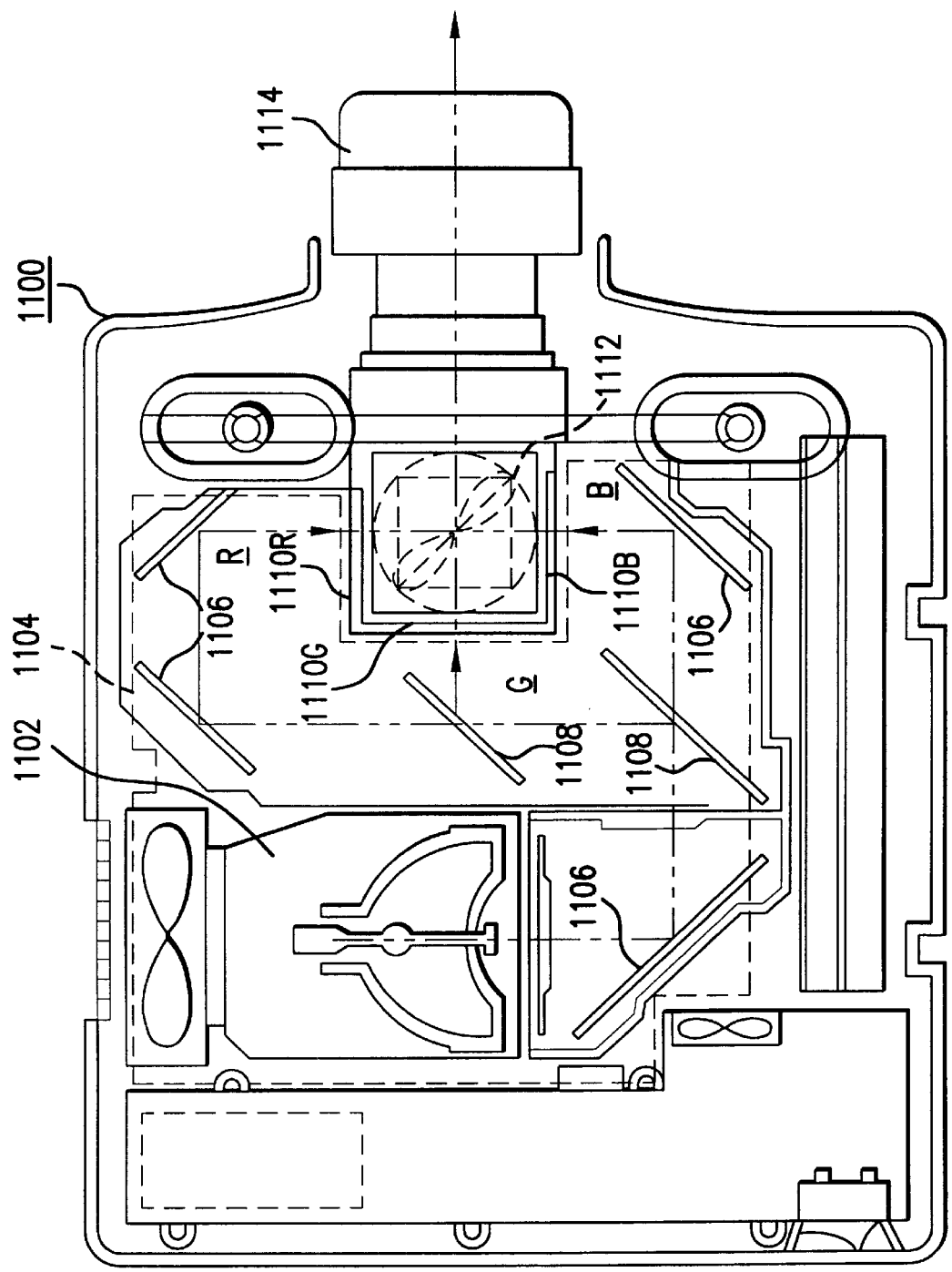
FIG. 13 is a schematic view of a projector which is an example of an electronic apparatus.
Figure 14:
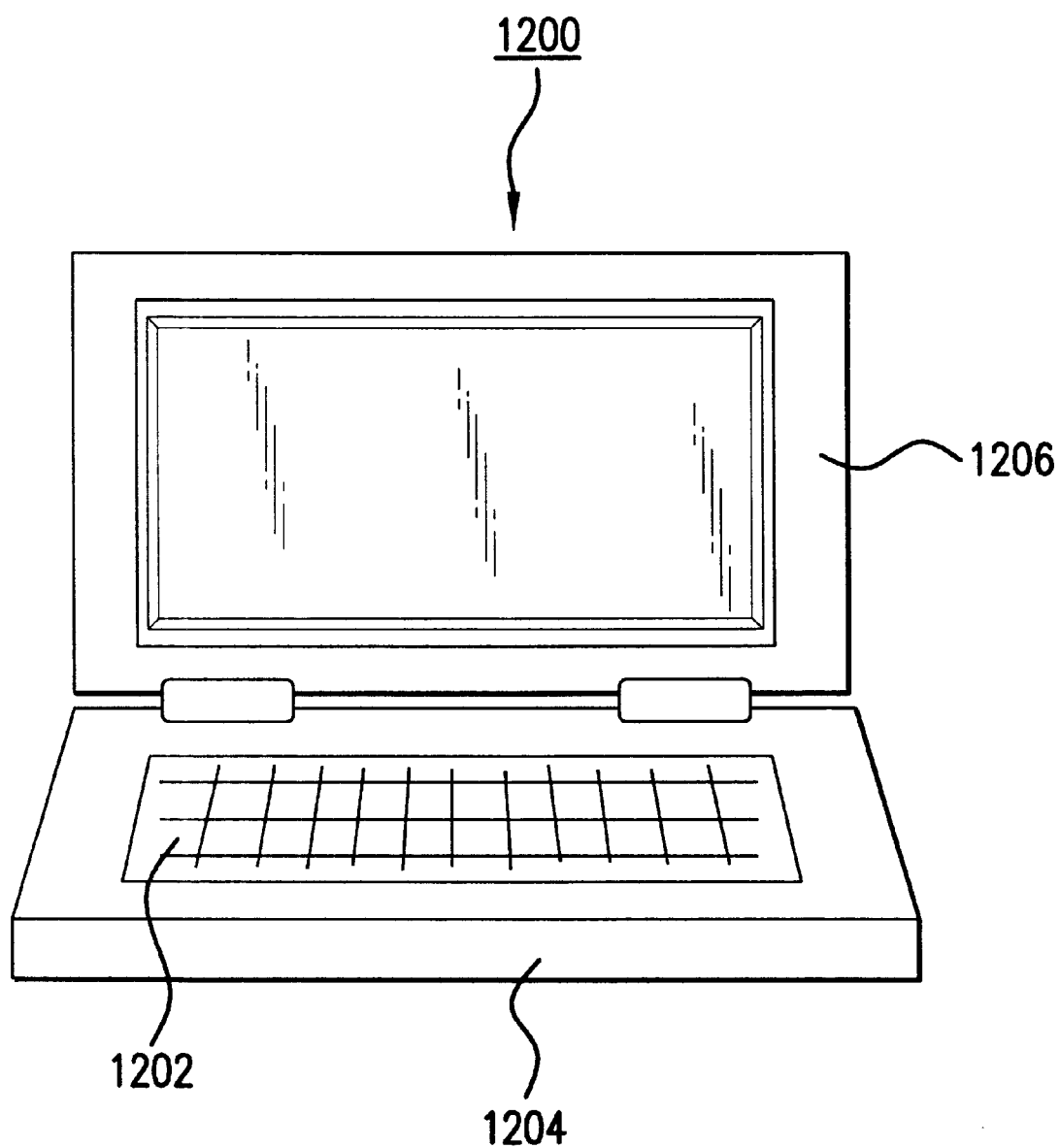
FIG. 14 is an exterior view of a personal computer which is an example of an electronic apparatus.
Figure 15:
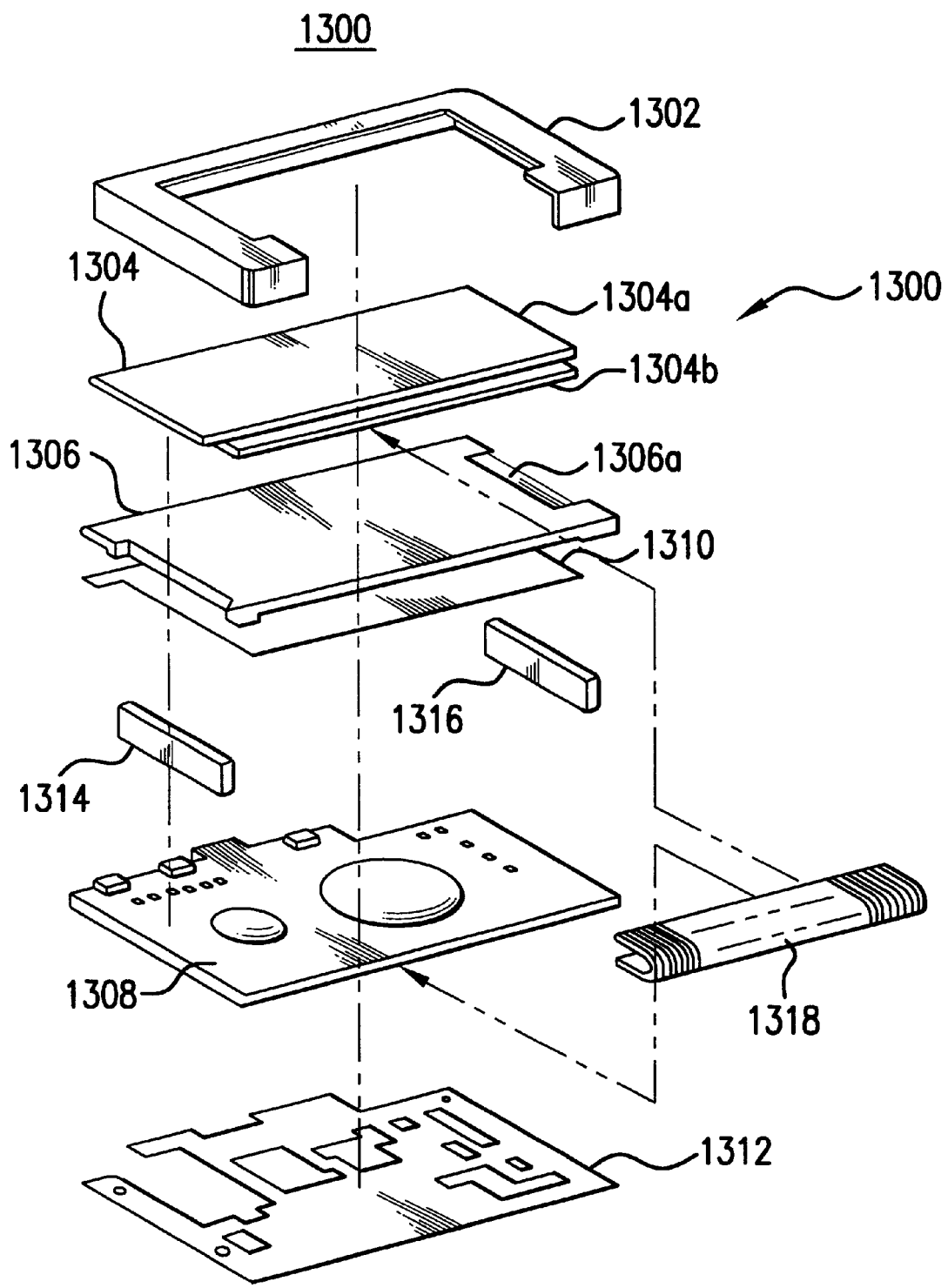
FIG. 15 is an exploded perspective view of a pager which is an example of an electronic apparatus.

Examples of the electronic apparatus having such a construction, in which it is assumed that YUV data is handled, include a liquid-crystal projector shown in FIG. 13, a personal computer (PC) and an engineering workstation (EWS), shown in FIG. 14, which can handle multimedia, a pager shown in FIG. 15, or a portable telephone, a word processor, a television, a view-finder-type or monitor-direct-view-type video tape recorder, an electronic notebook, an electronic desktop calculator, a car navigation apparatus, a POS terminal, and an apparatus with a touch panel.

The liquid-crystal projector shown in FIG. 13 is a projection-type projector using a transmission-type liquid-crystal panel as a light valve, which uses an optical system, for example, of a three-plate prism method. In FIG. 13, in the projector 1100, projection light emitted from a lamp unit 1102 as a white light source is separated into the three primary colors of R, G, and B by a plurality of mirrors 1106 and two dichroic mirrors 1108 inside a light guide 1104, and are guided to three liquid-crystal panels 1110R, 1110G, and 1110B which display an image of each color. Then, the light which is modulated by the respective liquid-crystal panels 1110R, 1110G, and 1110B is made to enter a dichroic prism 1112 from three directions. In the dichroic prism 1112, since the light of red R and blue B is bent by 90°, and light of green G travels straight, the images of each color are synthesized, and a color image is projected onto a screen or the like through a projection lens 1114.

The personal computer 1200 shown in FIG. 14 includes a main section 1204 having a keyboard 1202, and a liquid-crystal display screen 1206.

The pager shown in FIG. 15 includes, inside a metallic frame 1302, a light guide 1306 with a liquid-crystal display panel 1304 and a back light 1306a, a circuit substrate 1308, first and second shield plates 1310 and 1312, two elastic conductors 1314 and 1316, and a film carrier tape 1318. The two elastic conductors 1314 and 1316, and the film carrier tape 1318 are used to connect the liquid-crystal display panel 1304 to the circuit substrate 1308.

Here, the liquid-crystal display panel 1304 has a liquid crystal sealed between two transparent substrates 1304a and 1304b, and as a result, at least a dot-matrix-type liquid-crystal display panel is constructed. On one transparent substrate, the display driving circuit 1004 shown in FIG. 12, or in addition to this, a display information processing circuit 1002 can be formed. The circuit which is not mounted on the liquid-crystal display panel 1304 is made as an external circuit of the liquid-crystal display panel, and in the case of FIG. 15, it can be mounted onto the circuit substrate 1308.

Figure 16:
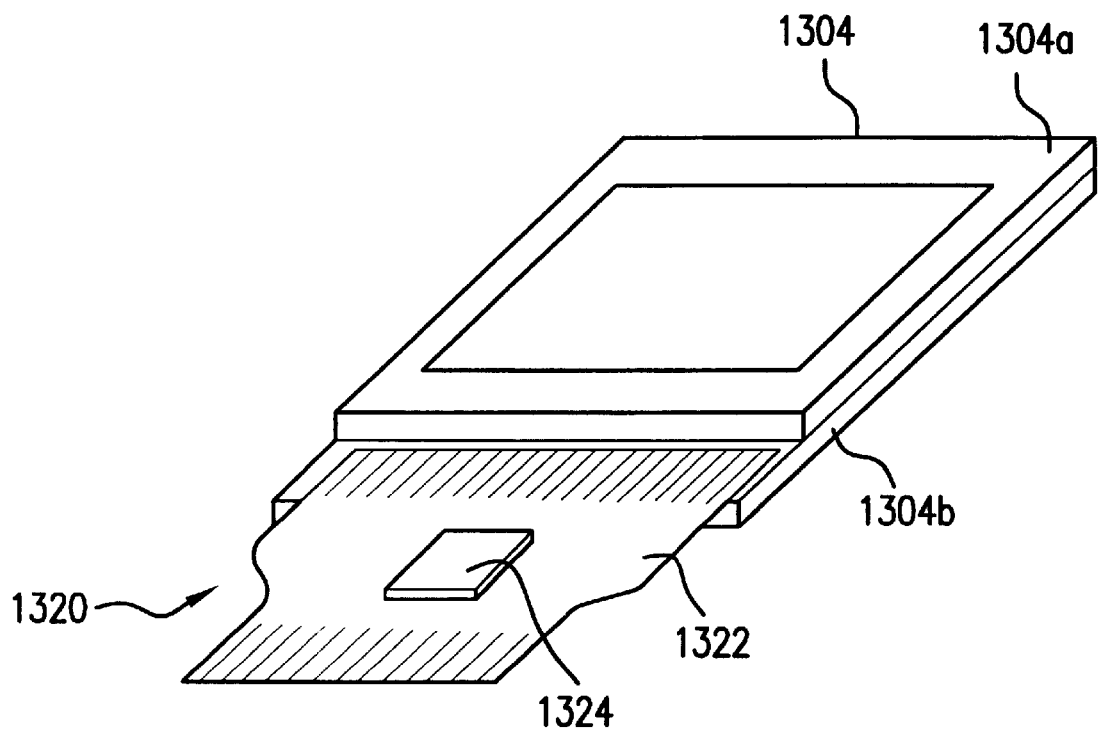
FIG. 16 is a schematic perspective view showing an example of a liquid-crystal display apparatus provided with an external circuit.

Since FIG. 15 shows the construction of the pager, in addition to the liquid-crystal display panel 1304, the circuit substrate 1308 is required. When the liquid-crystal display apparatus is used as a component for the electronic apparatus and when a display driving circuit or the like is mounted onto the transparent substrate, the minimum unit of the liquid-crystal display apparatus is the liquid-crystal display panel 1304. Alternatively, the liquid-crystal display panel 1304 fixed to a metal frame 1302 as a housing may be used as a liquid-crystal display apparatus which is a component for the electronic apparatus. Further, in the case of a back-light type, the liquid-crystal display panel 1304, and the light guide 1306 with a backlight 1306a may be incorporated within the metallic frame 1302, thus a liquid-crystal display apparatus can be constructed. In place of these, as shown in FIG. 16, a TCP (Tape Carrier Package) 1320 such that an IC chip 1324 is mounted onto a polymide tape 1322 formed with a metallic conductive film is connected to one of the two transparent substrates 1304a and 1304b which form the liquid-crystal display panel 1304, making it possible to be used as a liquid-crystal display apparatus which is a component for the electronic apparatus.

The present invention is not limited to the above-described embodiments, and various modifications are possible within the spirit and scope of the present invention. For example, the present invention is not limited to an apparatus for driving the above-described various liquid-crystal panels, and can be applied to other image display apparatuses, such as an electroluminescence, or a plasma display apparatus.

What is claimed is:

1. A YUV-RGB digital conversion circuit for converting a digital luminance signal Y and digital color-difference signals U and V into digital color signals R, G, and B, comprising:

a YV-R conversion section that converts a digital luminance signal Y and a digital color-difference signal V into a color signal R;

a YUV-G conversion section that converts a digital luminance signal Y and digital color-difference signals U and V into a color signal G;

a YU-B conversion section that converts a digital luminance signal Y and a digital color-difference signal U into a color signal B;

wherein each of the conversion sections includes:

a first bit-shift circuit that bit shifts one of the digital color-difference signals so as to generate a first bit-shifted signal;

a first adder that adds the one of the digital color-difference signals and the first bit-shifted signal so as to generate an added signal;

a second bit-shift circuit that bit shifts the added signal so as to generate a second bit shifted signal, and a second adder that generates a final signal using a signal being based on the second bit shifted signal, the final signal representing a product of the one of the digital color-difference signals and a sum of an expansion of $2^{-n}$ terms, one of the color signals R, G and B being generated based on the final signal.

2. The YUV-RGB digital conversion circuit according to claim 1, said first and second adders being connected in multiple stages so that the addition of the terms corresponding to a smaller term from among a plurality of $2^{-n}$ terms is performed with priority, and when the output of an adder of a previous stage is bit-shifted by a bit-shift circuit, a plurality of additions are performed while truncating low-order bits such that there is no addend to be added in the next stage and subsequent additions.

3. The YUV-RGB digital conversion circuit according to claim 1, said YUV-G conversion section includes at least said first and second adders for adding a term of a color-difference signal $U \times 2^{-i}$ (i is a natural number) and a term of a color-difference signal $V \times 2^{-j}$ (j is a natural number), such that the addition of terms where the difference (i–j) of each multiplier of the two terms that are the same is shared by one adder.

4. The YUV-RGB digital conversion circuit according to claim 1, wherein a carry-over signal, together with an addition output of predetermined bits, is output from an adder of a final stage, and there is further provided a luminance-limit circuit for inputting an output of said adder of the final stage and for setting said addition output of the predetermined bits to one.

5. The YUV-RGB digital conversion circuit according to claim 4, each conversion section including a computation unit for subtracting a predetermined gradation value from said color-difference signal U or V, a negative-code signal indicating that the output of said computation unit is negative, together with the addition output of predetermined bits and a carry-over signal that is output from the adder of the final stage, and said luminance-limit circuit forcibly sets said addition output of predetermined bits to zero in accordance with said negative-code signal.

6. The YUV-RGB digital conversion circuit according to claim 1, wherein the total number of expansion terms in which a coefficient to be multiplied by a digital color-difference signal is expanded to a plurality of $2^{-n}$ terms that is set to a finite number such that the SN ratio of each signal of RGB is 60 dB or greater.

7. An image display apparatus, comprising:

a YUV-RGB digital conversion circuit according to claim 1, an image display section for displaying an image in accordance with an RGB signal, a signal processing circuit for performing processing suitable for driving said image display section based on an RGB signal which is an output of said YUV-RGB digital conversion circuit, and a driving circuit for driving said image display section in accordance with an output of said signal processing circuit.

8. An image display apparatus according to claim 7, wherein said image display section is a liquid-crystal panel having a liquid crystal sealed between a pair of substrates.

9. An electronic apparatus comprising an image display apparatus according to claim 7, and a power-supply apparatus which supplies power to said image display apparatus.

* * * * *